(12) United States Patent
Kadota

(10) Patent No.: US 9,565,053 B2
(45) Date of Patent: *Feb. 7, 2017

(54) NON-TRANSITORY COMPUTER-READABLE MEDIUM, COMMUNICATION RELAY APPARATUS, AND IMAGE PROCESSING APPARATUS

(71) Applicant: Masatoshi Kadota, Takahama (JP)

(72) Inventor: Masatoshi Kadota, Takahama (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 300 days.

This patent is subject to a terminal disclaimer.

(21) Appl. No.: 14/068,146

(22) Filed: Oct. 31, 2013

(65) Prior Publication Data

US 2014/0122733 A1    May 1, 2014

(30) Foreign Application Priority Data

Oct. 31, 2012   (JP) .................................. 2012-240618

(51) Int. Cl.
  *G06F 15/16*    (2006.01)
  *H04L 12/24*    (2006.01)
  (Continued)

(52) U.S. Cl.
  CPC ......... *H04L 41/0246* (2013.01); *G06F 3/1209* (2013.01); *G06F 3/1236* (2013.01);
  (Continued)

(58) Field of Classification Search
  CPC ............ G06F 21/608; G06F 2221/2119; G06F 3/1209; G06F 3/1236; G06F 3/1288; H04L 41/0246; H04L 67/141
  (Continued)

(56) References Cited

U.S. PATENT DOCUMENTS 5,220,674 A    6/1993  Morgan et al.
7,383,321 B2*  6/2008  Moyer .................. G06F 3/1222
                                                    358/1.1

(Continued)

FOREIGN PATENT DOCUMENTS

JP    2003084931 A    3/2003
JP    2005011246 A    1/2005
(Continued)

OTHER PUBLICATIONS

Apr. 10, 2015—(US) Notice of Allowance—U.S. Appl. No. 14/068,518.

(Continued)

*Primary Examiner* — Moustafa M Meky
*Assistant Examiner* — Thorne E Waugh
(74) *Attorney, Agent, or Firm* — Banner & Witcoff, Ltd.

(57) ABSTRACT

A process and system are described in which a session is established between a client application and a communication relay program being executed by a processor. In response to a process request from the client application, session information is added to the process request to identify the established session. Next, the process request with the session information is transmitted to an image processing apparatus. Responses received from the image processing apparatus may include the session information to identify to which session each response belongs. The communication relay program removes the session information from the response and forwards the response to the client application through the relevant session.

13 Claims, 18 Drawing Sheets

(51) Int. Cl.
*G06F 3/12* (2006.01)
*G06F 21/60* (2013.01)
*H04L 29/08* (2006.01)

(52) U.S. Cl.
CPC .......... *G06F 3/1288* (2013.01); *G06F 21/608* (2013.01); *H04L 67/141* (2013.01)

(58) Field of Classification Search
USPC ....................................................... 709/228
See application file for complete search history.

(56) References Cited

U.S. PATENT DOCUMENTS

| | | |
|---|---|---|
| 7,583,400 B2 | 9/2009 | Yagita |
| 7,958,205 B2 | 6/2011 | Moyer et al. |
| 8,645,500 B2 | 2/2014 | Moyer et al. |
| 8,687,219 B2 | 4/2014 | Sato |
| 8,760,677 B2 | 6/2014 | Kanada |
| 9,110,611 B2* | 8/2015 | Kadota .................. G06F 3/121 |
| 2003/0002077 A1 | 1/2003 | Shima |
| 2003/0037108 A1 | 2/2003 | Peiffer et al. |
| 2003/0091015 A1 | 5/2003 | Gassho et al. |
| 2007/0033646 A1 | 2/2007 | Tosey et al. |
| 2007/0173077 A1 | 7/2007 | Wang |
| 2007/0208863 A1 | 9/2007 | Otsuka et al. |
| 2007/0253390 A1 | 11/2007 | Gassho et al. |
| 2009/0158052 A1* | 6/2009 | Yasuda ................. H04L 63/068 713/189 |
| 2009/0237728 A1* | 9/2009 | Yamamoto ............ G06F 3/1454 358/1.15 |
| 2010/0097644 A1* | 4/2010 | Takahashi ............. G06F 3/1204 358/1.15 |
| 2010/0268801 A1 | 10/2010 | Yukimasa |
| 2011/0001999 A1* | 1/2011 | Nanaumi ........... H04N 1/32117 358/1.14 |
| 2011/0128572 A1 | 6/2011 | Hosotsubo |
| 2011/0134465 A1 | 6/2011 | Gha |
| 2011/0188075 A1 | 8/2011 | Narushima et al. |
| 2011/0194146 A1 | 8/2011 | Sato |
| 2011/0302512 A1 | 12/2011 | Ishii |
| 2012/0016797 A1 | 1/2012 | Smith et al. |
| 2012/0069389 A1* | 3/2012 | Funatsu .................. G06F 3/122 358/1.15 |
| 2012/0227102 A1 | 9/2012 | Parla et al. |
| 2013/0050739 A1 | 2/2013 | Oshima et al. |
| 2014/0104653 A1 | 4/2014 | Moyer et al. |
| 2014/0122733 A1 | 5/2014 | Kadota |
| 2014/0129674 A1 | 5/2014 | Matsuda |
| 2014/0160522 A1 | 6/2014 | Kawasaki |

FOREIGN PATENT DOCUMENTS

| | | |
|---|---|---|
| JP | 2006268714 A | 10/2006 |
| JP | 2007219956 A | 8/2007 |
| JP | 2007-305049 | 11/2007 |
| JP | 2009049972 A | 3/2009 |
| JP | 2010113606 A | 5/2010 |
| JP | 2010122933 A | 6/2010 |
| JP | 2011118627 A | 6/2011 |
| JP | 2011-257945 | 12/2011 |
| WO | 2005050935 A1 | 6/2005 |

OTHER PUBLICATIONS

Dec. 4, 2014 (US) Notice of Allowance—U.S. Appl. No. 14/068,518.
Jul. 31, 2014 (US)—Non-Final Office Action received in U.S. Appl. No. 14/068,518.
Nov. 7, 2014 (US)—Non-Final Office Action—U.S. Appl. No. 14/010,752.
Co-pending U.S. Appl. No. 14/068,518, filed Oct. 31, 2013.
Dec. 2, 2014 (EP) Extended Search Report App. 13190932.7.
Co-pending U.S. Appl. No. 14/010,752, filed Aug. 27, 2013.
Mitchell, Andrew R., "IPP USB Specification (IPP over USB) Version 1.0 Draft 20," Apr. 29, 2011.
Jun. 3, 2015 (US) Non-Final Office Action—U.S. Appl. No. 14/010,752.
Dec. 22, 2015—(CN) Office Action—U.S. Appl. No. 201310364371.3 with English Translation.
Jan. 21, 2016—(CN) Notification of the First Office Action with Search Report—App 201310353873.6—Eng Tran.
Jan. 29, 2016—(US) Notice of Allowance—U.S. Appl. No. 14/010,752.
Sep. 27, 2016—(JP) Notice of Reasons for Rejection—App 2012-240735, Eng Tran.
Aug. 11, 2016 (CN) Office Action—App. 201310364371.3.
Jun. 7, 2016—(JP) Office Action—App 2012240618.
May 31, 2016—(JP) Office Action—App 2012193177.
Nov. 16, 2016 (EP) Extended Search Report—App 13182258.7.

* cited by examiner

NON-TRANSITORY COMPUTER-READABLE MEDIUM, COMMUNICATION RELAY APPARATUS, AND IMAGE PROCESSING APPARATUS

CROSS-REFERENCE TO RELATED APPLICATION

This application claims priority from Japanese Patent Application No. 2012-240618 filed on Oct. 31, 2012, which is incorporated herein by reference.

BACKGROUND

1. Technical Field

The present invention relates to a technique for relaying communication.

2. Description of the Related Art

A technique for displaying, for example, a setting screen of an image processing apparatus including a web server function unit on a web browser executed in a terminal apparatus has been disclosed.

In addition, a protocol called Internet Printing Protocol (IPP) is known, in accordance with which an image processing apparatus and a terminal apparatus are connected to each other by the Internet and the image processing apparatus processes images through the Internet.

Furthermore, a draft of a protocol called IPP over Universal Serial Bus (USB) is known. The "IPP over USB" enables an image processing apparatus and a terminal apparatus to communicate with each other in accordance with the IPP in an environment in which the image processing apparatus and the terminal apparatus are connected to each other by USB.

SUMMARY

In general, a web browser and a web server function unit communicate with each other using multisession. Therefore, when the web browser displays a setting screen of an image processing apparatus or the like, the web browser communicates with the web server function unit using multisession.

However, USB does not include a concept of multisession. Therefore, when a web browser and a web server function unit communicate with each other using multisession in an environment in which a terminal apparatus and an image processing apparatus are connected to each other by USB, the web server might undesirably transmit a response to a request in a certain session to the web browser as a response to a request in a different session if the web browser sequentially transmits requests in a plurality of sessions to the web server. As a result, confusion might arise in the communication.

A technique for enabling a client application to communicate with an image processing apparatus through a communication interface that does not include a concept of multisession using multisession without confusion is disclosed herein.

DESCRIPTION OF THE PREFERRED EMBODIMENTS

First Embodiment

A first embodiment will be described with reference to FIGS. 1 to 10.

(1) Image Processing System

Figure 1:
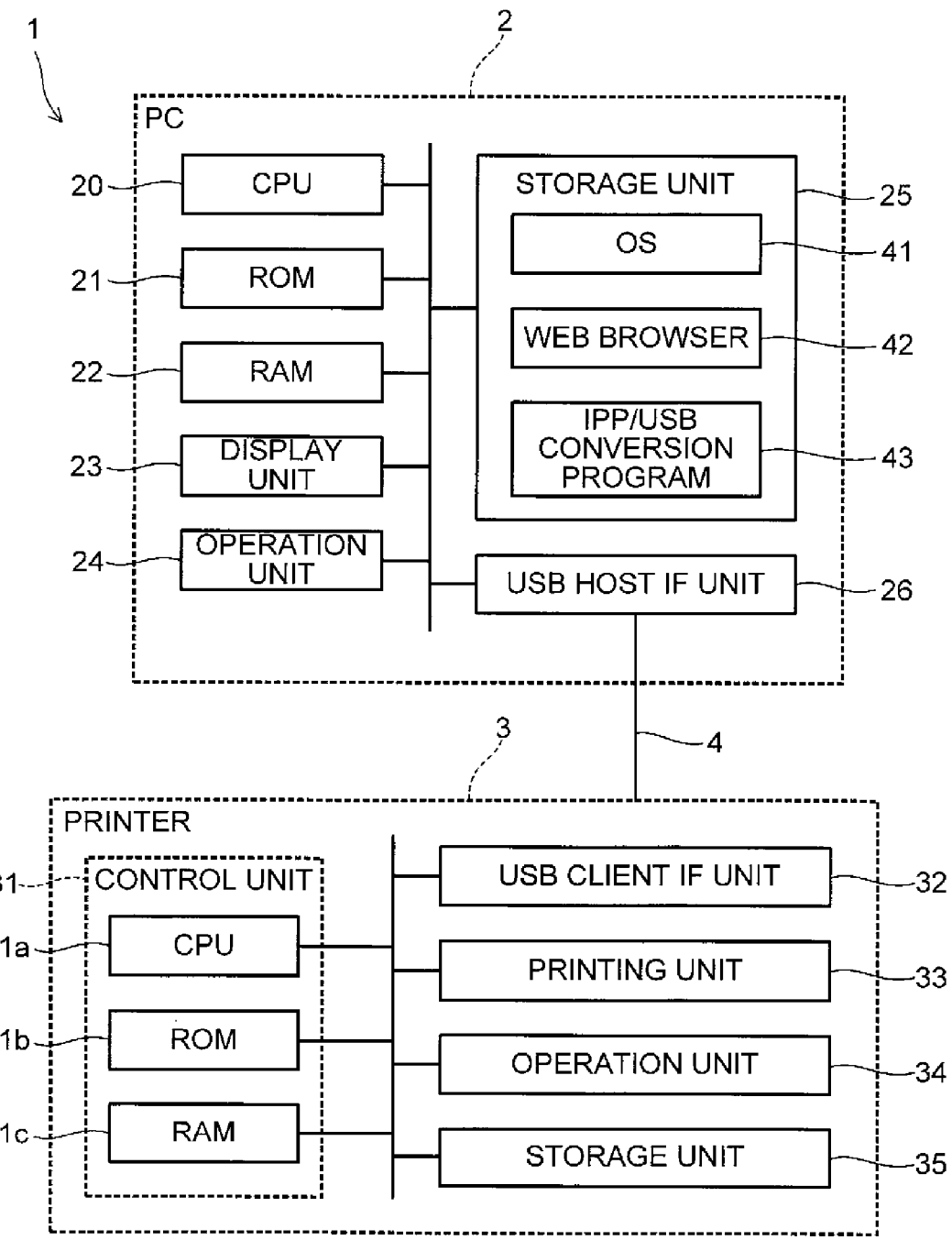
FIG. 1 is a block diagram illustrating the electrical configurations of a personal computer (PC) and a printer according to a first embodiment.

First, an image processing system 1 according to the first embodiment will be described with reference to FIG. 1. The image processing system 1 includes a PC 2 and a printer 3. Each of the PC 2 and the printer 3 includes a USB interface and are communicably connected to each other through the USB interface by a USB cable 4. In addition, the printer 3 is configured as a USB printer class device.

The PC 2 is an example of an information processing apparatus and a communication relay apparatus. The printer 3 is an example of an image processing apparatus. The USB interface is an example of a communication interface.

The PC 2 may perform at least two types of communication (a) and (b) with the printer 3 through the USB cable 4.

(a) Communication for setting the printer 3

(b) Communication for transmitting print data to the printer 3

These types of communication are performed in accordance with the "IPP over USB" (Version 1.0 Draft 20 as of Oct. 31, 2012). The IPP is a protocol based on the HyperText Transfer Protocol (HTTP), and is a protocol for communicating with a printer through a Transmission Control Protocol/Internet Protocol (TCP/IP) network such as the Internet or a local area network (LAN).

The "IPP over USB" is a protocol for implementing communication according to the IPP in an environment in which apparatuses are connected to each other by USB. According to the "IPP over USB", communication data according to the IPP is stored in a USB packet and communicated.

(1-1) Electrical Configuration of PC

The electrical configuration of the PC 2 will be described with reference to FIG. 1. The PC 2 includes a central processing unit (CPU) 20, a read-only memory (ROM) 21, a random-access memory (RAM) 22, a display unit 23, an operation unit 24, a storage unit 25, and a USB host interface unit 26 (denoted as USB host IF unit in FIG. 1).

The CPU 20 controls the components of the PC 2 by executing programs stored in the ROM 21 and the storage unit 25. The ROM 21 stores programs and data to be executed by the CPU 20. The RAM 22 is used as a main storage device for the CPU 20 to execute various processes. The CPU 20 is an example of a first processing unit.

The display unit 23 includes a display device such as a liquid crystal display and a display driving circuit that drives the display device.

The operation unit 24 includes a keyboard and a mouse. The keyboard and the mouse are connected to an interface of the PC 2.

The storage unit 25 is a device that stores various programs and pieces of data using a nonvolatile memory such as a hard disk drive and/or a flash memory. The storage unit 25 stores programs such as an operating system (OS) 41, a web browser 42, and an IPP/USB conversion program 43. These programs are executed by the CPU 20.

The IPP/USB conversion program 43 is an example of a communication relay program. The web browser 42 is an example of a client application that communicates using multisession. The storage unit 25 is an example of a storage device.

The USB host interface unit 26 includes a USB host controller and a jack to which the USB cable 4 is connected, and is communicably connected to the printer 3 through the USB cable 4. The USB host interface unit 26 is an example of a first communication device.

(1-2) Printer

Next, the electrical configuration of the printer 3 will be described with reference to FIG. 1. The printer 3 includes a control unit 31, a USB client interface unit (denoted as USB client IF unit in FIG. 1) 32, a printing unit 33, an operation unit 34, and a storage unit 35.

The control unit 31 includes a CPU 31a, a ROM 31b, and a RAM 31c. The CPU 31a controls the components of the printer 3 by executing control programs stored in the ROM 31b and the storage unit 35. The ROM 31b stores control programs and various pieces of data to be executed by the CPU 31a. The RAM 31c is used as a main storage device for the CPU 31a to execute various processes. The CPU 31a is an example of a second processing unit and a response device.

The printing unit 33 is a device that prints an image on a sheet such as a print sheet using an electrophotographic method, an inkjet method, or the like.

The operation unit 34 includes a display device such as a liquid crystal display and various operation buttons.

The storage unit 35 is a device that stores various pieces of data using a nonvolatile memory such as a hard disk or a flash memory. The storage unit 35 is an example of a storage device.

The USB client interface unit 32 includes a jack to which the USB cable 4 is connected, and is communicably connected to the PC 2 through the USB cable 4. The USB client interface unit 32 is an example of a second communication device.

In addition, the printer 3 includes a first tray and a second tray in which print sheets are stored.

(2) Program Configuration of PC and Functions of Printer

Figure 2:
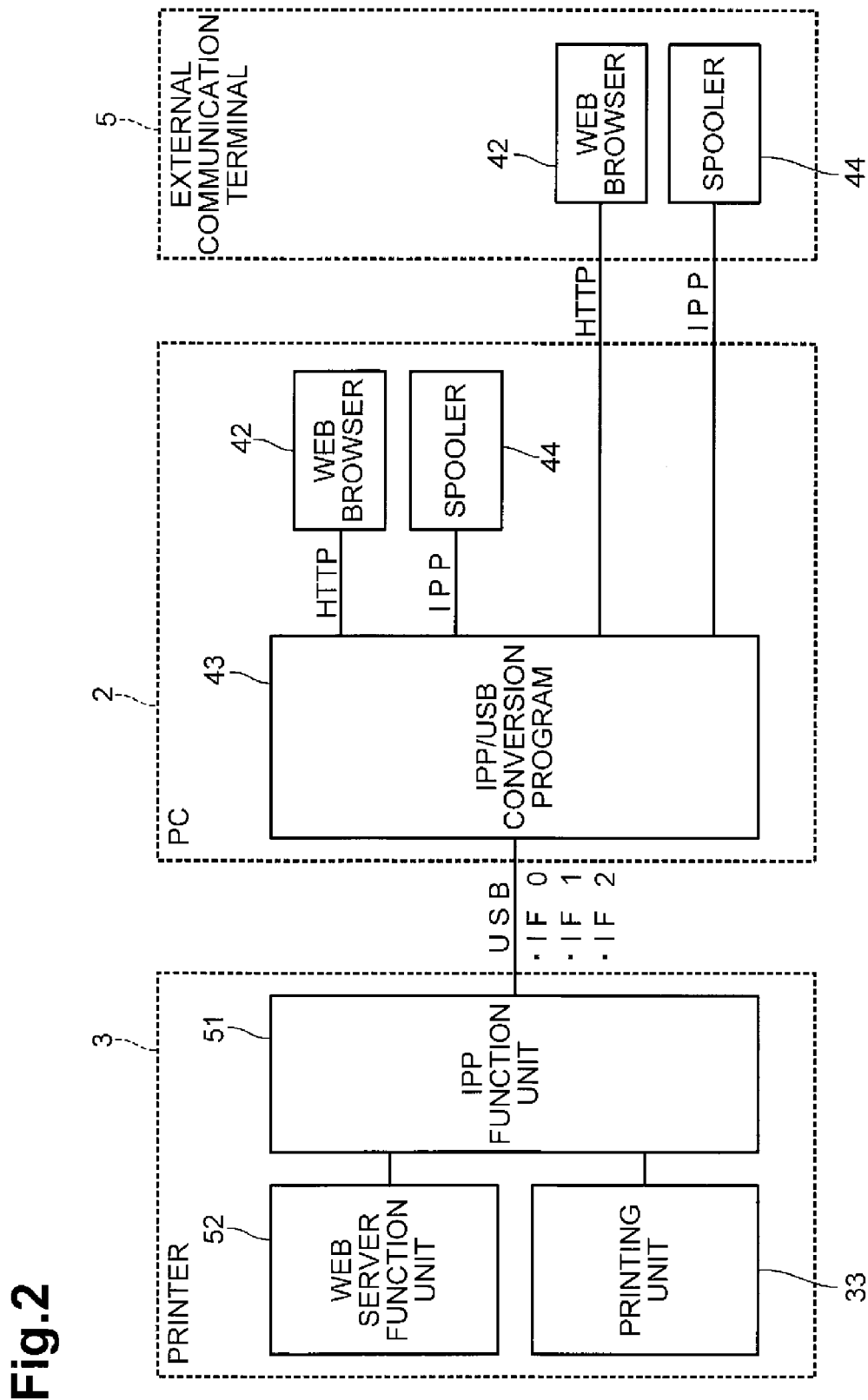
FIG. 2 is a block diagram illustrating the program configuration of the PC and the functions of the printer.

Next, the program configuration of the PC 2 and the functions of the printer 3 for enabling communication according to the IPP over USB will be described with reference to FIG. 2.

(2-1) Program Configuration of PC

First, the program configuration of the PC 2 will be described. The PC 2 executes the IPP/USB conversion program 43, the web browser 42, and a spooler 44.

The IPP/USB conversion program 43 is implemented for relaying the communication (a) for setting the printer 3 between the web browser 42 and an IPP function unit 51 of the printer 3 in accordance with the HTTP and the communication (b) for transmitting print data to the printer 3 between the spooler 44 and the IPP function unit 51 in accordance with the IPP.

The IPP/USB conversion program 43 is a resident server program for "http://localhost:80". "localhost" means the IP address of the PC 2, namely, for example, "127.0.0.1". "80" means a port number to be used. The port number may be omitted.

In addition, the IPP/USB conversion program 43 communicates with the IPP function unit 51 via USB. Details of the IPP/USB conversion program 43 will be described later.

The web browser 42 is used as a user interface for a user to set the printer 3. A conventional web browser may be used as the web browser 42.

In an environment in which the PC 2 and the printer 3 are connected to each other by the USB cable 4, the web browser 42 transmits, to port "80" of localhost, an HTTP request for requesting transmission of screen data for displaying a setting screen 60 (refer to FIG. 3) of the printer 3, an HTTP request for requesting transmission of an image to be displayed on the setting screen 60, and the like. These HTTP requests are examples of a process request. In the following description, an HTTP request will be simply referred to as a process request.

The types of process requests are not limited to those described above. For example, an HTTP request (a PUT command, a POST command, or the like) for setting a value set by the user on the setting screen 60 to the printer 3 is also an example of the process request.

Upon receiving a process request from the web browser 42, the IPP/USB conversion program 43 transmits the process request to the IPP function unit 51 through the USB cable 4.

Here, it is assumed that screen data is written in HyperText Markup Language (HTML) or Extensible Markup Language (XML). The screen data is generated when a web server function unit 52 of the printer 3 has executed a setting screen Common Gateway Interface (CGI), details of which will be described later.

The spooler 44 is a program for storing data through spooling. The spooler 44 is provided as a part of the OS 41. In the environment in which the PC 2 and the printer 3 are connected to each other by the USB cable 4, the spooler 44 transmits print data to the IPP/USB conversion program 43 by communicating with the IPP/USB conversion program 43 in accordance with the IPP.

Upon receiving print data from the spooler 44, the IPP/USB conversion program 43 transmits the print data to the IPP function unit 51 of the printer 3 through the USB cable 4.

The web browser 42 and the spooler 44 may be executed by the PC 2, or may be executed by an external communication terminal 5 communicably connected to the PC 2.

(2-2) Functions of Printer

Next, the functions of the printer 3 will be described. The printer 3 includes the printing unit 33, the IPP function unit 51, and the web server function unit 52.

The IPP function unit 51 is a function realized by the control unit 31 of the printer 3 by executing a control program. The IPP function unit 51 communicates with the IPP/USB conversion program 43 through the USB cable 4. In addition, the IPP function unit 51 communicates with the web server function unit 52 in accordance with the HTTP and the printing unit 33 in accordance with a certain protocol.

The web server function unit 52, too, is realized by the control unit 31 of the printer 3 by executing a control program. For example, upon receiving a request to transmit screen data, the web server function unit 52 executes a process for generating the screen data for displaying the setting screen 60 by executing the setting screen CGI. And, upon receiving a value set on the setting screen 60, the web server function unit 52 executes a process for setting the set value to the printer 3 by executing a printer setting CGI.

(3) USB Interfaces

Next, USB interfaces will be described. According to USB, one or more logical communication interfaces called "Interfaces" are configured in the single physical USB cable 4.

According to USB, a special endpoint called "endpoint 0" for performing control transfer is invariably configured. At Endpoint 0 bidirectional communication is available. An "Interface" is configured in accordance with an interface descriptor obtained from the printer 3 through endpoint 0. Each"Interface" generally includes one or a plurality of endpoints.

In the printer 3 according to the present embodiment, "Interface 1" and "Interface 2" are configured in the single physical USB cable 4. Furthermore, "Interface 1" and "Interface 2" each include a read endpoint and write endpoint, and implement bidirectional communication using the read endpoint and the write endpoint.

The above-described communication (a) for setting the printer 3 is performed using "Interface 1", and the communication (b) for transmitting print data to the printer 3 is performed using "Interface 2".

Alternatively, both the communication (a) for setting the printer 3 and the communication (b) for transmitting print data to the printer 3 may be performed using "Interface 1" without configuring "Interface 2" in the USB cable 4.

(4) Problem that Arises when Communication is Performed Using Multisession Through USB Next, a problem that arises when communication is performed using multisession through USB will be described.

In the following description, the communication (a) for setting the printer 3 will be taken as an example.

Figure 3:
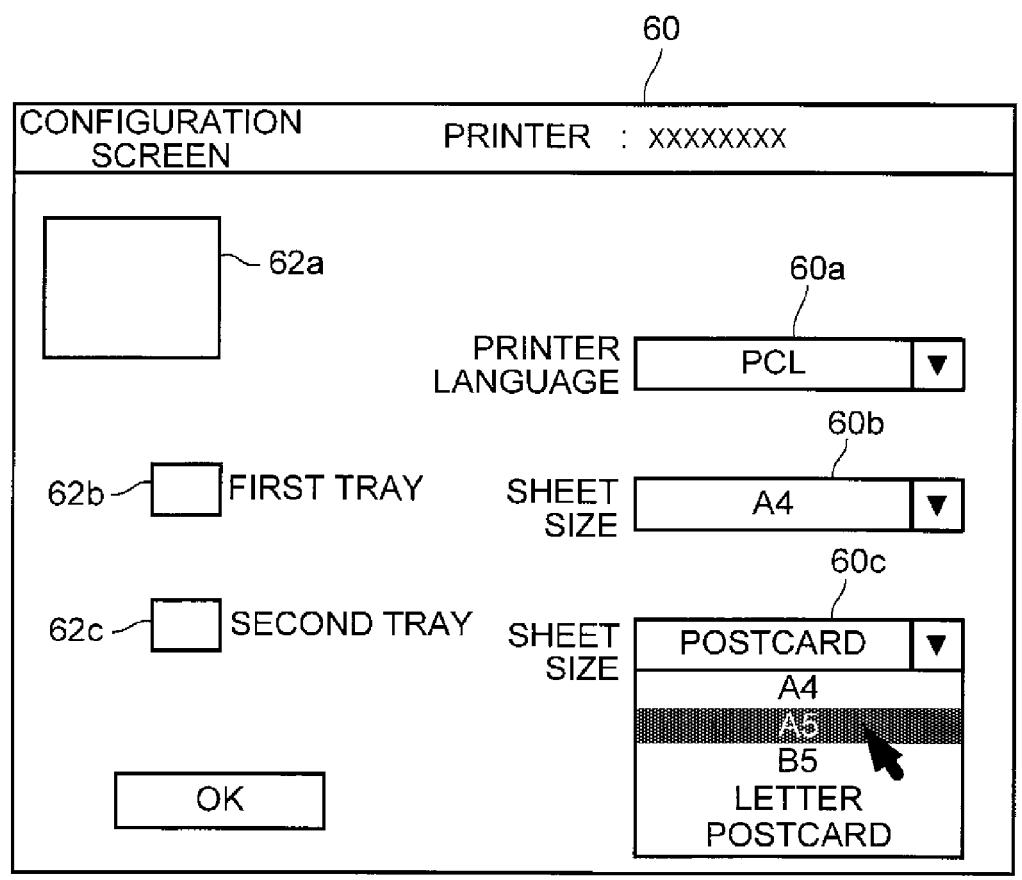
FIG. 3 is a schematic diagram illustrating an example of a setting screen of the printer.

First, the setting screen 60 of the printer 3 will be described with reference to FIG. 3. In the setting screen 60 illustrated in FIG. 3, a printer language 60a, a size 60b of sheets in the first tray, and a size 60c of sheets in the second tray may be set. In addition, images 62a, 62b, and 62c are displayed in the setting screen 60. Here, the images 62a, 62b and 62c will be referred to as GIF 1, GIF 2, and GIF 3, respectively.

The web browser 42 requests port "80" of localhost to establish a session, and requests, through the established session, the IPP/USB conversion program 43 to transmit screen data regarding the setting screen 60. This request is made by transmitting a GET command. The GET command is an example of the process request.

The GET command is transmitted by the IPP/USB conversion program 43 to the IPP function unit 51 through the USB cable, and then to the web server function unit 52 from the IPP function unit 51. Upon receiving the GET command, the web server function unit 52 generates the screen data regarding the setting screen 60 by executing the setting screen CGI. The web server function unit 52 then transmits the screen data generated by executing the setting screen CGI to the IPP function unit 51 in response to the GET command.

Upon receiving the screen data from the web server function unit 52, the IPP function unit 51 transmits the screen data to the IPP/USB conversion program 43 through the USB cable 4.

Upon receiving the screen data from the IPP function unit 51, the IPP/USB conversion program 43 transmits the screen data to the web browser 42 in response to the GET command received from the web browser 42.

The web browser 42 analyzes the screen data, and requests necessary components (GIF 1, GIF 2, GIF 3, and the like) for displaying a page in a similar manner. In this case, since the web browser 42 may perform communication using multisession, the web browser 42 requests transmission of images by establishing a session for each of the necessary components (GIF 1, GIF 2, and GIF 3).

For example, first, the web browser 42 requests establishment of a session for requesting transmission of GIF 1, and then requests establishment of a session for requesting transmission of GIF 2 without waiting for a response to a process request transmitted through the former session. Similarly, the web browser 42 requests establishment of a session for requesting transmission of GIF 3 without waiting for a response to a process request transmitted through the session for requesting transmission of GIF 2.

However, USB interfaces do not include a concept of multisession. And the IPP function unit 51 may respond to each of the GET commands regardless the receipt order of the GET commands.

Therefore, in case where each session communicates through "Interface 1", when the IPP/USB conversion program 43 receives a response from the IPP function unit 51, it may not be available that the IPP/USB conversion program 43 determines that the received response is in response to a particular GET command in a particular session. As a result, confusion might arise in the communication and a response to a certain session might be undesirably transmitted to another session.

Therefore, the IPP/USB conversion program 43 transmits a process request including a session identifier (ID), which is a process request (the GET command in the above example) to which the session ID for identifying a session has been added, to the IPP function unit 51, and receives a response including the session ID, which is a response to which the session ID has been added, from the IPP function unit 51 in response to the process request. The session ID is an example of session information and a session identifier.

The IPP/USB conversion program 43 then transmits a response obtained by removing the session ID from the response including a session ID to the web browser 42 through the session identified by the session ID.

(5) General Procedure of Communication

Figure 4:
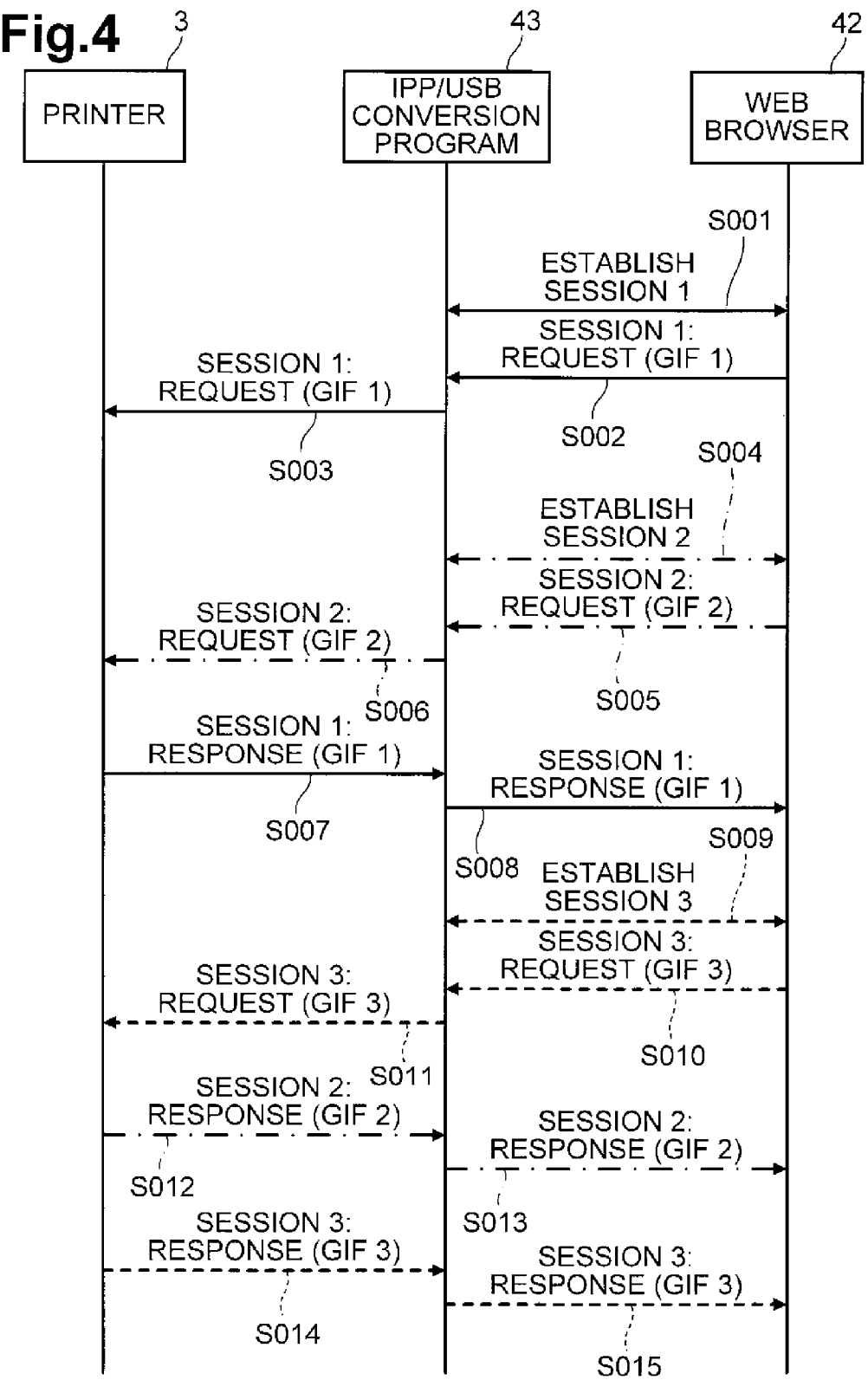
FIG. 4 is a sequence chart illustrating the general procedure of a process for relaying communication.

First, the general procedure of communication will be described with reference to FIG. 4. In the following description, the communication (a) for setting the printer 3 will be taken as an example. As described above, the communication (a) for setting the printer 3 is performed using Interface 1.

The description begins with requests to the IPP/USB conversion program 43 to transmit GIF 1, GIF 2, and GIF 3, while assuming that the web browser 42 has already received screen data regarding the setting screen 60 from the IPP/USB conversion program 43 and completed an analysis.

Here, the IPP function unit 51 and the web server function unit 52 will be collectively referred to as the printer 3.

First, the web browser 42 requests the IPP/USB conversion program 43 to establish Session 1, and Session 1 is established (S001). Next, the web browser 42 transmits a process request to request transmission of GIF 1 to the IPP/USB conversion program 43 through Session 1 (S002).

Upon receiving the process request through Session 1, the IPP/USB conversion program 43 transmits a process request including a session ID, which is the process request to which a session ID for identifying Session 1 has been added, to the printer 3 through the USB cable 4 (S003).

Upon receiving the process request including a session ID, the printer 3 transmits GIF 1 to the IPP/USB conversion program 43 in response to the process request (S007). At this time, the printer 3 adds the session ID added to the process request including a session ID to the response, and transmits the response.

Upon receiving the response including a session ID, the IPP/USB conversion program 43 transmits a response obtained by removing the session ID from the response including a session ID to the web browser 42 through a session identified by the session ID, that is, Session 1 (S008).

After requesting establishment of Session 1, the web browser 42 establishes Session 2 without waiting for reception of GIF 1 through Session 1 (S004), and transmits a process request to request transmission of GIF 2 to the IPP/USB conversion program 43 through Session 2 (S005).

Upon receiving the process request through Session 2, the IPP/USB conversion program 43 transmits a process request including a session ID, which is the process request to which a session ID for identifying Session 2 has been added, to the printer 3 through the USB cable 4 (S006).

Upon receiving the process request including the session ID, the printer 3 transmits GIF 2 to the IPP/USB conversion program 43 in response to the process request (S012). At this time, the printer 3 adds the session ID added to the process request including a session ID to the response.

Upon receiving the response including a session ID, the IPP/USB conversion program 43 transmits a response obtained by removing the session ID from the response including a session ID to the web browser 42 through a session identified by the session ID, that is, Session 2 (S013).

A request and a response to the request through a session are made for Session 3 in a similar manner.

Through this series of processes, GIF 1 to GIF 3 are read by the web browser 42 and displayed on the setting screen 60.

Similarly, an operation performed on the setting screen 60 is converted into a process request such as a GET command, a PUT command, or a POST command according to the HTTP or the like and then transmitted to the printer 3 through the IPP/USB conversion program 43. Therefore, the printer 3 may be set through the USB cable 4 in the same procedure as that when the printer 3 is set through a conventional TCP/IP network.

(6) Data Structures of Process Request and Response

Figure 5:
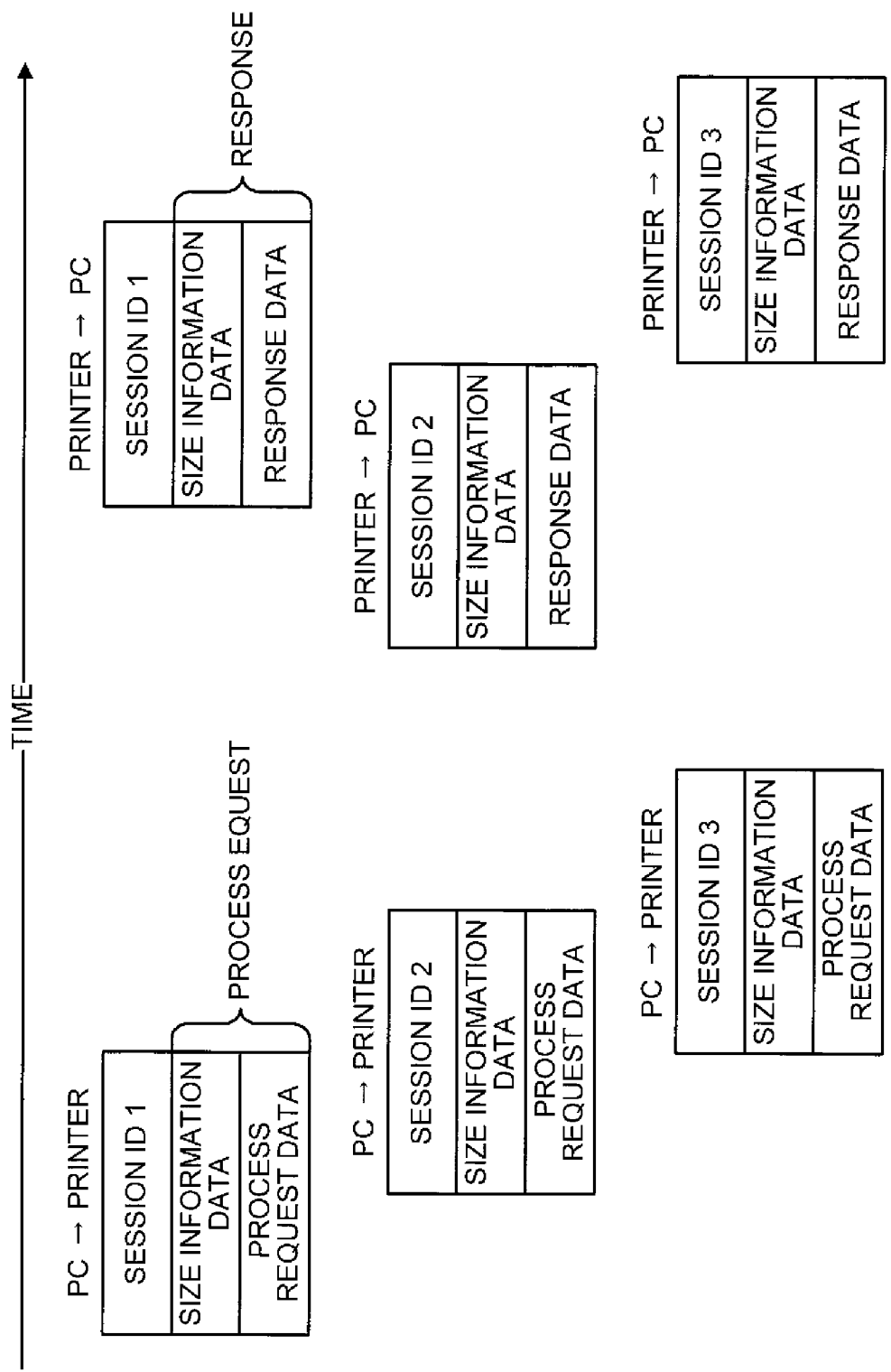
FIG. 5 is a schematic diagram illustrating process requests including session IDs and responses including the session IDs.

Next, the data structures of a process request to which a session ID has been added and a response to which a session ID has been added will be described with reference to FIG. 5.

(6-1) Data Structure of Process Request to Which Session ID has Been Added

First, the data structure of a process request to which a session ID has been added will be described. In the following description, a POST command will be taken as an example.

Because the data structure of a process request is in compliance with the HTTP specification and is widely used, only the outline thereof will be described herein. A process request includes size information data and process request data.

The size information data indicates the size of the process request data.

The process request data includes one or more pieces of communication data. An example of the process request data is as follows. Here, a line number is indicated in brackets before each piece of communication data.
[1] Post/ipp/[function] HTTP/1.1<CR><LF>
[2] Host: localhost<CR><LF>
[3] Content-Type: application/ipp<CR><LF>
[4] Transfer-Encoding: chunked<CR><LF>
[5] <CR><LF>

In the above example, each line indicates a piece of communication data. As can be seen from the above example, each piece of communication data ends with <CR><LF>. <CR><LF> means carriage return and line feed.

In addition, as described in the line 5, the last piece of communication data of a process request includes only <CR><LF>. Therefore, when a received piece of communication data includes only <CR><LF>, it may be determined that reception of a process request has been completed.

In the case of a PUT command or a POST command, additional data such as binary data or text data is normally included in addition to these pieces of communication data. Additional data is regarded as a part of a process request herein.

When the number of bytes of all pieces of additional data is not identified in advance, it is indicated in a process request by "Transfer-Encoding: chunked" or the like that there are a series of small data chunks. In this case, the size of each data chunk is indicated.

When additional data is included, a line such as "Content-Length: 4554" may be inserted into a process request instead of the above-mentioned "chunked", thereby indicating that additional data having a specified number of bytes (4,554 bytes in this case) follows.

The size information data, each piece of communication data, the additional data, and each small data chunk of additional data are examples of partial process request data. That is, the IPP/USB conversion program 43 receives a process request from the web browser 42 while dividing the process request into a plurality of pieces of partial process request data.

The partial process request data may take various forms depending on the method for performing a process. For example, a process request may be received by each data length having a fixed value or determined by a particular condition, and each piece of data having the data length may be determined as a piece of partial process request data.

(6-2) Data Structure of Response to Which Session ID has Been Added

Because the data structure of a response also is in compliance with the HTTP specifications and is widely used, only the outline thereof will be described herein. A response includes size information data and response data.

The size information data indicates the size of the response data.

The response data includes one or more pieces of communication data, and a last piece of communication data includes only <CR><LF>. In the case of response data corresponding to a GET command, additional data such as binary data or text data is included as in the case of a process request. For example, the above-described GIF 1 to GIF 3 are additional data included in a response corresponding to a GET command.

The size information data, each piece of communication data, the additional data, and each small data chunk of additional data are examples of partial response data. That is, the IPP/USB conversion program 43 receives a response from the IPP function unit 51 while dividing the response into a plurality of pieces of partial response data. The partial response data may take various forms depending on the method for performing a process.

Figure 6:
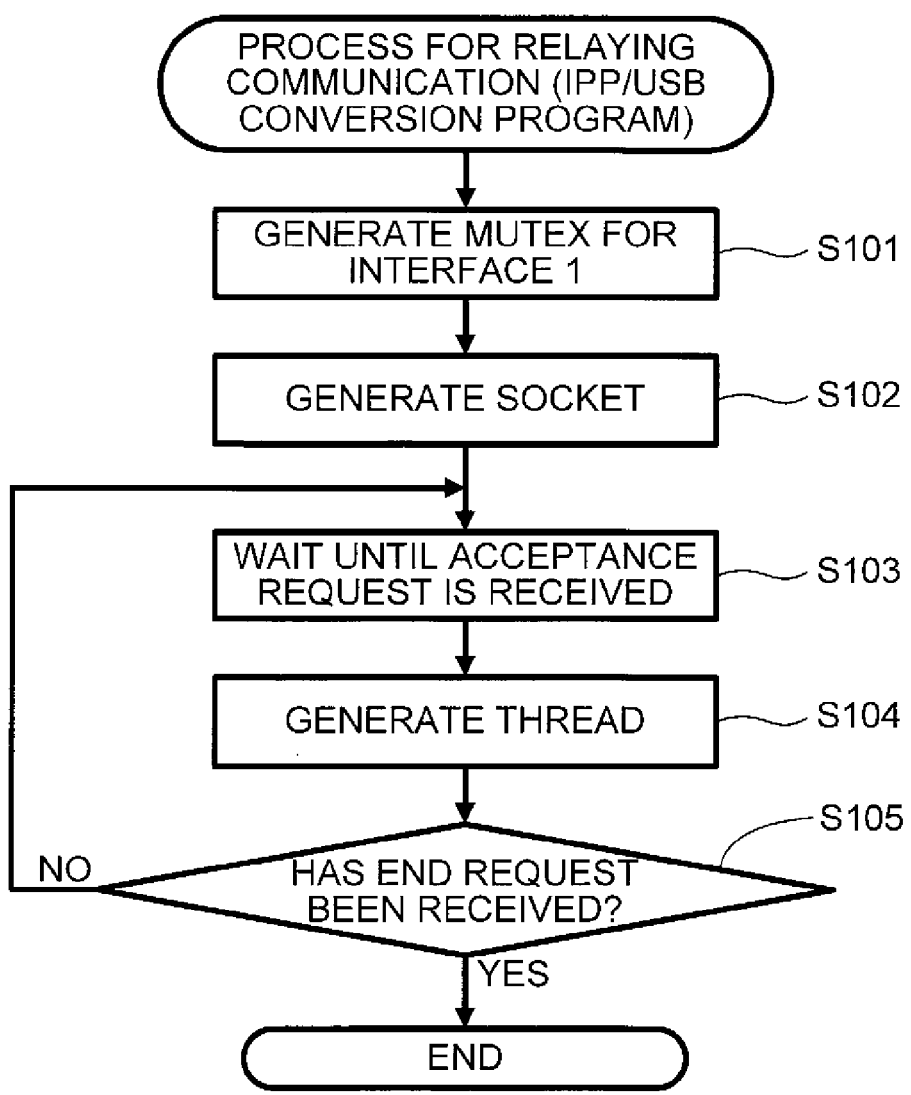
FIG. 6 is a flowchart illustrating the process for relaying communication.

(7) Details of Process for Relaying Communication Performed by IPP/USB Conversion Program Next, a process for relaying communication performed by the IPP/USB conversion program 43 will be described more specifically with reference to FIG. 6. As described above, the IPP/USB conversion program 43 is executed as a resident program, and the process for relaying communication begins when power is supplied to the PC 2.

The process for relaying communication is a process for relaying communication between the web browser 42 and the IPP function unit 51, and a process for relaying communication between the spooler 44 and the IPP function unit 51 is executed as a process different from the present process. Description of this another process is omitted.

In S101, the IPP/USB conversion program 43 generates mutual exclusion (mutex) for exclusively using Interface 1. The mutex is a mechanism for performing an exclusion process, and provided by a program language. Details of the mutex will be described later.

Although a case in which the exclusion process is performed using the mutex will be taken as an example in the following description, the method for performing the exclusion process is not limited to this. For example, the exclusion process may be performed using a semaphore, or using an original method without using the mutex or a semaphore.

In S102, the IPP/USB conversion program 43 generates and sets a socket that monitors a request (acceptance request) to establish a session. A socket is a logical interface for performing communication in accordance with the TCP/IP. Setting of a socket refers to setting the IP address of the PC 2, a port number indicating a communication port to be monitored, and the like to the socket and determining the operation mode of the socket as a mode in which the acceptance request is monitored. In the present embodiment, "127.0.0.1" is set as the IP address, and "80" is set as the port number.

When the user has opened the web browser 42 and set "127.0.0.1" as the IP address and "80" as the port number, the web browser 42 requests the IP address and the port number to establish a session. This request is the acceptance request.

In S103, the IPP/USB conversion program 43 waits until the acceptance request is received from the web browser 42, and the process proceeds to S104 when the acceptance request has been received.

In S104, the IPP/USB conversion program 43 generates a thread.

In S105, the IPP/USB conversion program 43 determines whether or not an end request has been received from the OS 41. The end request is a request to end the IPP/USB conversion program 43, which is a resident program. Since the IPP/USB conversion program 43 is a resident program, the result of the determination is normally negative, but the IPP/USB conversion program 43 receives an end request when, for example, the user has performed an operation for requesting ending of the IPP/USB conversion program 43. If an end request has been received, the IPP/USB conversion program 43 ends the process, and if an end request has not been received, the process returns to S103 and is repeated.

(7-1) Process for Receiving Process Request from Web Browser

Figure 7:
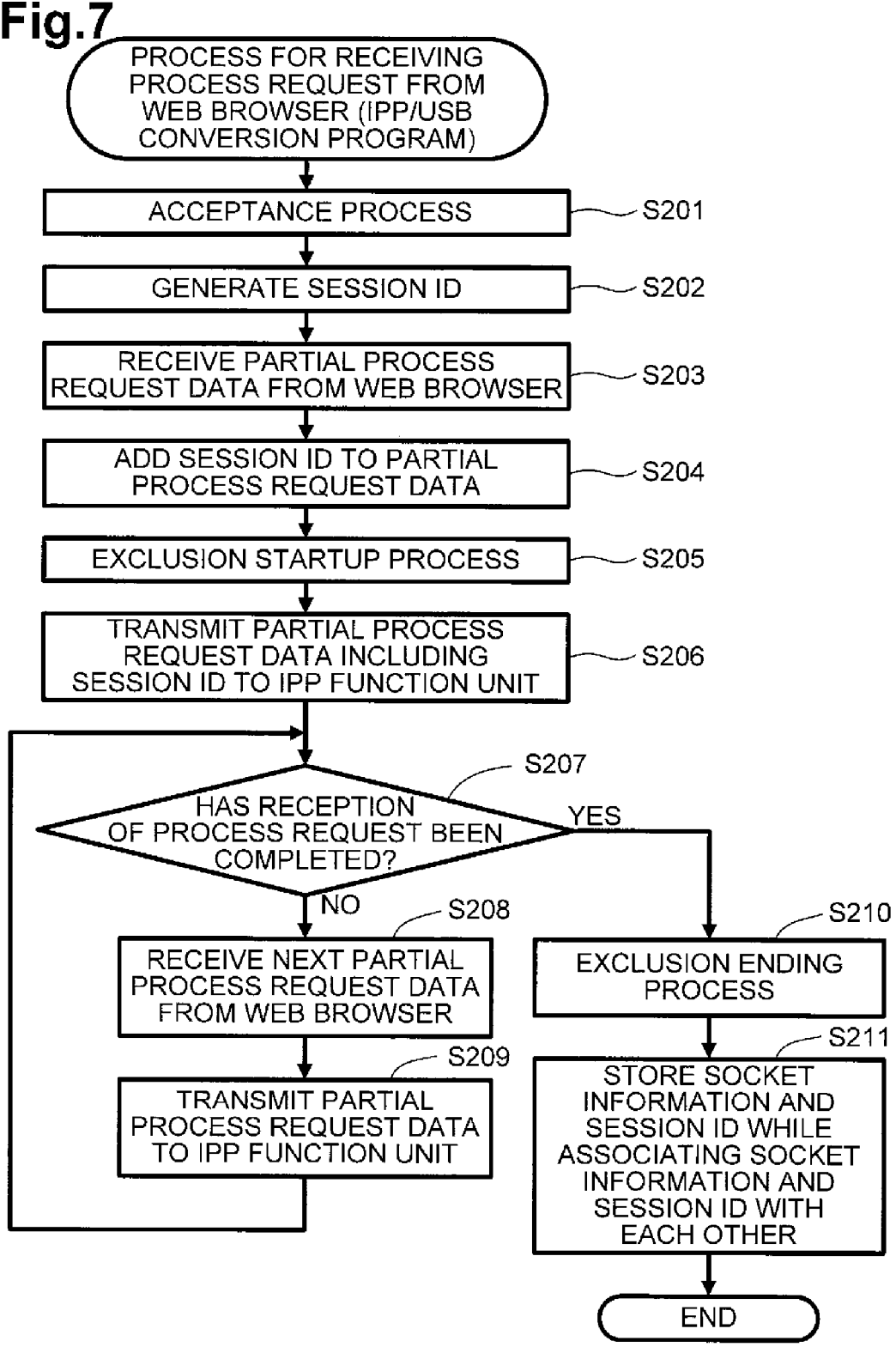
FIG. 7 is a flowchart illustrating a process for receiving a process request from a web browser.

Next, a process for receiving a process request from the web browser 42 performed by the IPP/USB conversion program 43 will be described with reference to FIG. 7. This process is executed by a particular thread generated in S104, which has been described above. That is, when there is a plurality of acceptance requests, the process is executed by different threads. Therefore, only one session is assumed in a flowchart of FIG. 7, and when there is a plurality of sessions, the process illustrated by the flowchart of FIG. 7 is executed by different threads in parallel with one another.

In S201, a particular thread executes an acceptance process. The acceptance process is for establishing a new session with a component, which is the web browser 42, which has transmitted an acceptance request. S201 is an example of a first establishment process.

More specifically, the particular thread generates a new socket for communicating with the web browser 42, and establishes a session with the web browser 42 using the generated socket. The IPP/USB conversion program 43 may transmit information to the printer 3 through control transfer using endpoint 0 of USB at the timing of opening, closing, or acceptance of the socket, and may be synchronized with the printer 3 at the timing of opening, closing, or acceptance of the socket.

In S202, the particular thread generates an ID for identifying the socket generated in S201. Because the socket and the session are in a one-to-one correspondence, the ID for identifying the socket may also be used as an ID for identifying the session. In the following description, an ID for identifying a socket will be referred to as a session ID. S202 is an example of an identifier generation process.

In S203, the particular thread receives a piece of partial process request data from the web browser 42 through the session established in S201. S203 is an example of a first request reception process.

In S204, the particular thread adds the session ID generated in S202 to the piece of partial process request data received in S203. More specifically, the session ID is added in accordance with a predetermined rule. One example of the predetermined rule is that first 8 bytes of the piece of partial process request data is defined as the session ID. Another example of the predetermined rule is that a first line of the piece of partial process request data is defined as the session ID.

In S205, the particular thread executes the exclusion process for "Interface 1".

More specifically, the particular thread tries to obtain the mutex generated in S101. If the mutex has not been obtained by another thread, the particular thread obtains the mutex, and then other threads that have tried to obtain the mutex enter a standby state and remains in the standby state until the mutex is released by the particular thread. Thus, the other threads are not allowed for performing communication.

On the other hand, if the mutex has been obtained by another thread, the particular thread enters the standby state and remains in the standby state until the particular thread may obtain the mutex. Thus, the particular thread is not allowed for performing communication. When the another thread has released the mutex, yet another thread may obtain the mutex if there is the yet another thread that has entered the standby state earlier than the particular thread, and the particular thread still remains in the standby state. If there is no other thread that has entered the standby state earlier than the particular thread, the particular thread obtains the mutex.

After the particular thread obtains the mutex, the process proceeds to S206.

In S206, the particular thread transmits the piece of partial process request data generated in S204, which includes the session ID, to the IPP function unit 51 through the USB cable 4. S206 is an example of a first request transmission process.

In S207, the particular thread determines whether or not reception of the process request has been completed. More specifically, the particular thread determines whether or not there has been an end of the data in accordance with the HTTP. For example, the particular thread determines whether or not there has been an end of the data by checking whether or not there has been <CR><LF> or checking the size of additional data indicated by "Content-Length" or "Transfer-Encoding: chunked". In doing so, whether or not reception of the process request has been completed may be determined.

If the particular thread determines that reception of the process request has not been completed, the process proceeds to S208. If the particular thread determines that reception has been completed, the process proceeds to S210.

In S208, the particular thread receives a next piece of partial process request data from the web browser 42.

In S209, the particular thread transmits the piece of partial process request data received in S208 to the IPP function unit 51 through the USB cable 4. However, the particular thread transmits the piece of partial process request data without adding a session ID.

In S210, the particular thread ends the exclusion process for "Interface 1". Therefore, the exclusion process is performed during a period of S205 to S210, that is, until all pieces of partial process request data in the session are transmitted in S206 and S209, and partial process request data in another session does not interrupt as a result of a process performed by another thread during the period.

In S211, the particular thread stores socket information for identifying the socket generated in S201 and the session ID generated in S202 in the storage unit 25 while associating the socket information and the session ID with each other. S211 is an example of a storage process. The socket information is an example of identification information for identifying a session.

However, the socket continues to exist even after the process ends. That is, the session between the IPP/USB conversion program 43 and the web browser 42 remains. This is because the IPP/USB conversion program 43 transmits a response to the web browser 42 using the session.

(7-2) Process for Receiving Response from IPP Function Unit

Next, a process for receiving a response from the IPP function unit 51 performed by the IPP/USB conversion program 43 will be described with reference to FIG. 8. The process follows the S211.

In S301, the IPP/USB conversion program 43 receives from the IPP function unit 51 a response to a process request transmitted to the IPP function unit 51. The IPP function unit 51 divides the response into a plurality of pieces of partial response data, adds a session ID to a first piece of partial response data, and transmits the plurality of pieces of partial response data to the IPP/USB conversion program 43, details of which will be described later. In S301, a piece of partial response data including a session ID, which is the first piece of partial response data to which the session ID has been added, is received. S301 is an example of a first response reception process.

In S302, the IPP/USB conversion program 43 obtains the session ID from the piece of partial response data including a session ID. The IPP function unit 51 adds to the first piece of partial response data the session ID in accordance with a predetermined rule. One example of the predetermined rule is that first 8 bytes of the response data is defined as the session ID. Another example of the predetermined rule is that a first line of the partial process request data is defined as the session ID. Therefore, the IPP/USB conversion program 43 obtains a part of the response data added in accordance with the predetermined rule as the session ID.

In S303, the IPP/USB conversion program 43 reads socket information, stored in the storage unit 25, associated with the session ID obtained in S302.

In S304, the IPP/USB conversion program 43 removes the session ID from the piece of partial response data including a session ID received in S301.

In S305, the IPP/USB conversion program 43 transmits the piece of partial response data from which the session ID has been removed in S304 to the web browser 42 through the session identified by the socket information read in S303. S305 is an example of a first response transmission process.

In S306, the IPP/USB conversion program 43 determines whether or not reception of the response from the IPP function unit 51 has been completed. This determination is made in the same procedure as that in S207. If the IPP/USB conversion program 43 determines that reception of the response has not been completed, the process proceeds to S307, and if the IPP/USB conversion program 43 determines that reception of the response has been completed, the process proceeds to S309.

In S307, the IPP/USB conversion program 43 receives a next piece of partial response data through the USB cable 4. A session ID is not added to the next piece of partial response data.

In S308, the IPP/USB conversion program 43 transmits the piece of partial response data received in S307 to the web browser 42 through the session identified by the socket information read in S303.

In S309, the IPP/USB conversion program 43 discards the socket identified by the socket information read in S303.

In S310, the IPP/USB conversion program 43 deletes the session ID obtained in S302 and the socket information associated with the session ID from the storage unit 25. S310 is an example of a deletion process.

(8) Processes Performed by IPP Function Unit

Next, a process for receiving a process request from the IPP/USB conversion program 43 and a process for receiving a response from the web server function unit 52 performed by the IPP function unit 51 will be described.

(8-1) Process for Receiving Process Request from IPP/USB Conversion Program

First, the process for receiving a process request from the IPP/USB conversion program 43 performed by the IPP function unit 51 will be described with reference to FIG. 9.

In S401, the IPP function unit 51 receives partial process request data from the IPP/USB conversion program 43 through the USB cable 4. As described above, a session ID has been added to a first piece of partial communication request data. S401 is an example of a second request reception process.

In S402, the IPP function unit 51 obtains the session ID from the piece of partial process request data including a session ID received in S401. In S204, the session ID is added to the piece of partial process request data in accordance with the predetermined rule. Therefore, the IPP function unit 51 obtains a part of the piece of partial process request data added in accordance with the predetermined rule as the session ID.

In S403, the IPP function unit 51 determines whether or not the session ID obtained in S402 is stored in the storage unit 35. As described according to S404 and S405 later, upon generating a new socket that has received the piece of process request data including a session ID, the IPP function unit 51 stores a socket information for the new socket in the storage unit 35 while associating the socket information with communication identification information for identifying the new socket. If the IPP function unit 51 determines in S403 that the session ID is not stored in the storage unit 35, the process proceeds to S404, and if the IPP function unit 51 determines in S403 that the session ID is stored in the storage unit 35, the process proceeds to S406. S403 is an example of a storage determination process.

In S404, the IPP function unit 51 generates a socket for communicating with the web server function unit 52, and establishes a new session with the web server function unit 52 through the generated socket. S404 is an example of a second establishment process. The session established between the IPP function unit 51 and the web server function unit 52 is an example of communication.

In S405, the IPP function unit 51 stores the session ID obtained in S402 and socket information for identifying the socket generated in S404 in the storage unit 35 while associating the session ID and the socket information with each other. S405 is an example of a storage process. The socket information is an example of communication identification information.

In S406, the IPP function unit 51 reads socket information associated with the session ID obtained in S402 from the storage unit 35.

In S407, the IPP function unit 51 removes the session ID from the piece of partial process request data including a session ID received in S401.

In S408, the IPP function unit 51 transmits the piece of partial process request data from which the session ID has been removed in S407 or a piece of partial process request data to which a session ID has not been added received in S410, which will be described later, to the web server function unit 52 through the socket generated in S404 or a socket identified by the socket information read in S406. S408 is an example of a second request transmission process.

In S409, the IPP function unit 51 determines whether or not reception of the process request has been completed. This determination may be made in the same procedure as that in S207, which has been described above. If the IPP function unit 51 determines that reception of the process request has not been completed, the process proceeds to S410, and if the IPP function unit 51 determines that reception has been completed, the process proceeds to S411.

In S410, the IPP function unit 51 receives a next piece of partial process request data from the IPP/USB conversion program 43 through the USB cable 4. However, a session ID has not been added to the piece of partial process request data received here.

In S411, the IPP function unit 51 generates a thread. This thread is used for receiving a response from the web server function unit 52 and transmitting the response to the IPP/USB conversion program 43.

(8-2) Process for Receiving Response from Web Server Function Unit

Figure 10:
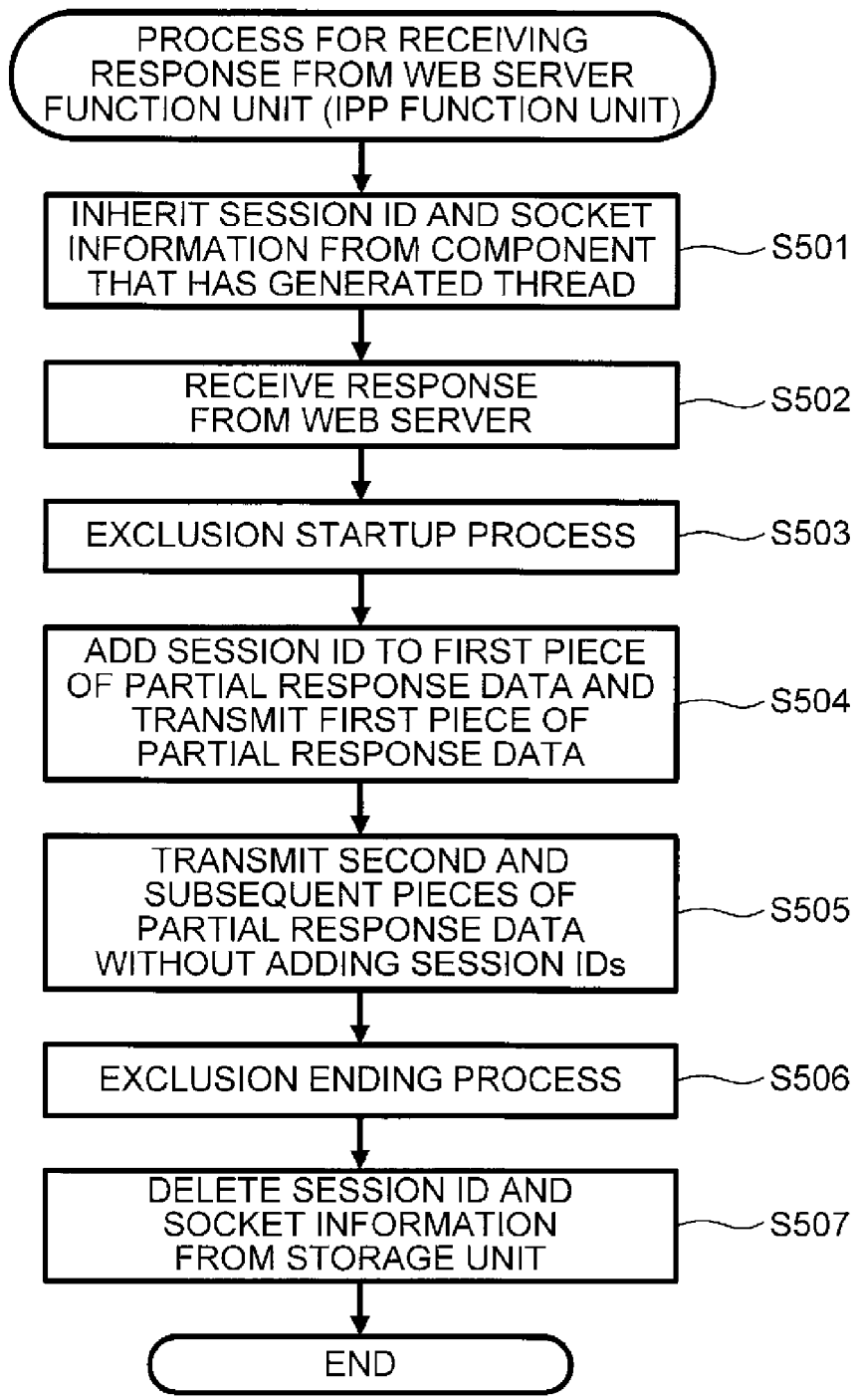
FIG. 10 is a flowchart illustrating a process for receiving a response from a web server function unit.

Next, a process for receiving a response from the web server function unit 52 performed by the IPP function unit 51 will be described with reference to FIG. 10. This process is executed by the thread generated in S411, which has been described above.

In S501, the thread inherits the session ID obtained in S402 and the socket information regarding the socket generated in S404 or the socket information read in S406.

In S502, the thread receives a response from the web server function unit 52. Here, the thread causes the process to proceed to S503 after reception of a response from the web server function unit 52 is completed. For example, if a response is received from the web server function unit 52 while being divided into pieces of partial response data, the process proceeds to S503 after reception of all the pieces of partial response data is completed. S502 is an example of a second response reception process.

In S503, the thread executes the exclusion process for Interface 1. More specifically, the thread obtains mutex for "Interface 1". The mutex obtained here is different from that generated in S101. The mutex obtained here is, for example, that generated in an initialization process performed when power is supplied to the printer 3.

In S504, the thread divides the response into a plurality of pieces of partial response data, adds the session ID inherited in S501 to a first piece of partial response data, and transmits the first piece of partial response data to the IPP/USB conversion program 43.

In S505, the thread sequentially transmits second and subsequent pieces of partial response data to the IPP/USB conversion program 43 without adding session IDs.

S504 and S505 described above are examples of a second response transmission process.

In S506, the thread ends the exclusion process for "Interface 1".

In S507, the thread deletes the session ID and the socket information inherited in S501 from the storage unit 35.

(9) Advantageous Effects Produced by Embodiment

According to the IPP/USB conversion program 43 described above, a session ID is added to a process request received from the web browser 42. According to the IPP/USB conversion program 43, since a process request including a session ID is then transmitted to the IPP function unit 51 and a response including a session ID is received from the IPP function unit 51 in response to the process request, it is possible to identify through which session the response is to be transmitted to the web browser 42 on the basis of the session ID added to the response when the response has been received from the IPP function unit 51.

Therefore, according to the IPP/USB conversion program 43, even when a web browser and a web server communicate with each other through a communication interface that does not include a concept of multisession, such as a USB interface, the web browser 42 may communicate with the printer 3 through the USB cable (more specifically, "Interface 1") using multisession without confusion.

Session IDs are not added to the process request and the response in the conventional art since USB does not include a concept of sessions. According to the present embodiment, communication may be performed without confusion even in accordance with the "IPP over USB" by adding session IDs to the process request and the response using the IPP/USB conversion program 43.

Furthermore, according to the IPP/USB conversion program 43, since, after a process request is transmitted to the IPP function unit 51, transmission and reception of data relating to another process request may be performed without waiting a response to the process request, time for which data is not transferred through the USB cable due to the wait for the response to the process request may be reduced, thereby improving processing speed.

Furthermore, according to the IPP/USB conversion program 43, since a session ID added to a response including the session ID and socket information associated with the session ID are deleted from the storage unit 25, unnecessary session IDs and socket information do not remain in the storage unit 25.

Furthermore, according to the IPP/USB conversion program 43, since only one session ID is transmitted for each process request, the amount of data to be transmitted may be reduced compared to a case in which a session ID is transmitted for each piece of partial process request data.

In addition, according to the printer 3, a process request including a session ID may be received from the IPP/USB conversion program 43, and a response including a session ID may be transmitted to the PC 2 in response to the process request. In doing so, correspondence between the process request and the response is assured.

Furthermore, according to the printer 3, the IPP function unit 51 and the web server function unit 52 may respond to each other without confusion.

Second Embodiment

Next, a second embodiment will be described with reference to FIGS. 11 to 16.

Process requests including session IDs according to the second embodiment will be described with reference to FIG. 11. The above-described IPP/USB conversion program 43 according to the first embodiment transmits only one session ID to the IPP function unit 51 for each process request. On the other hand, an IPP/USB conversion program 43 according to the second embodiment divides a process request received from a web browser 42 into a plurality of pieces of partial process request data, adds a session ID for each of the plurality of pieces of partial request data, and transmits the plurality of pieces of partial process request data.

The plurality of pieces of partial process request data may fall into the following categories:
(a) Header
(b) Data chunks of additional data collectively specified by "Content-Length"
(c) Data chunks obtained by dividing additional data specified by "chunked" specification Here, the header refers to data in the process request other than the additional data. When additional data has not been added, the entirety of the process request corresponds to the header. An actual request includes only (a), (a) and (b), or (a) and one or more (c).

Upon receiving a header of a process request through, for example, Session 1, the IPP/USB conversion program 43 according to the second embodiment transmits a header including a session ID, which is obtained by adding a session ID regarding Session 1 to the header, to an IPP function unit 51.

Next, upon receiving a header through Session 2 before the transmission of the response through Session 1 is completed, the IPP/USB conversion program 43 transmits a header including a session ID, which is obtained by adding a session ID regarding Session 2 to the header, to the IPP function unit 51. Similarly, each time the IPP/USB conversion program 43 has received a piece of partial process request data through a session, the IPP/USB conversion program 43 adds a session ID regarding the session through which the piece of partial process request data has been received to the piece of partial process request data, and transmits the piece of partial process request data to the IPP function unit 51.

Figure 11:
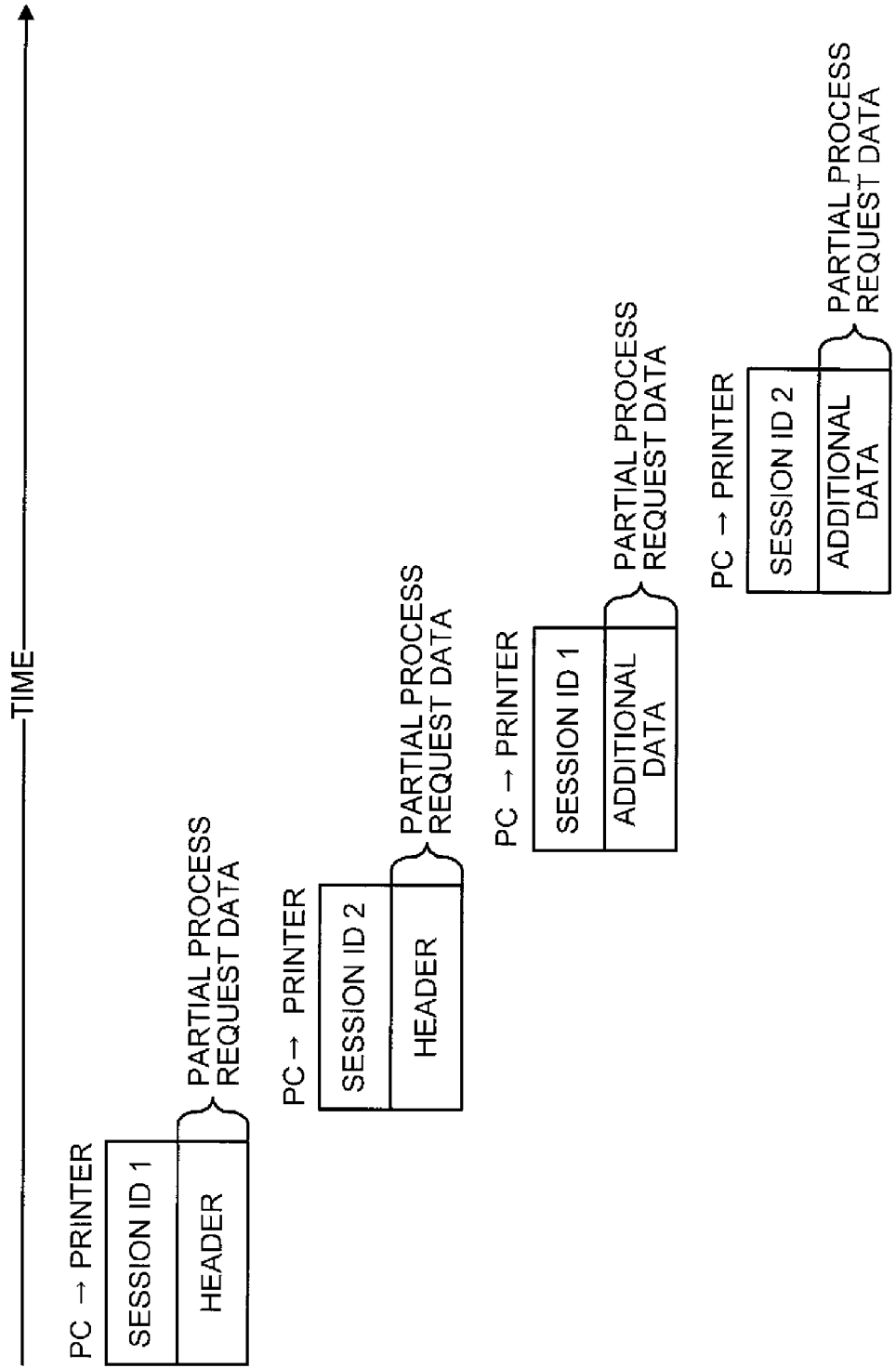
FIG. 11 is a schematic diagram illustrating process requests including session IDs according to a second embodiment.
Figure 12:
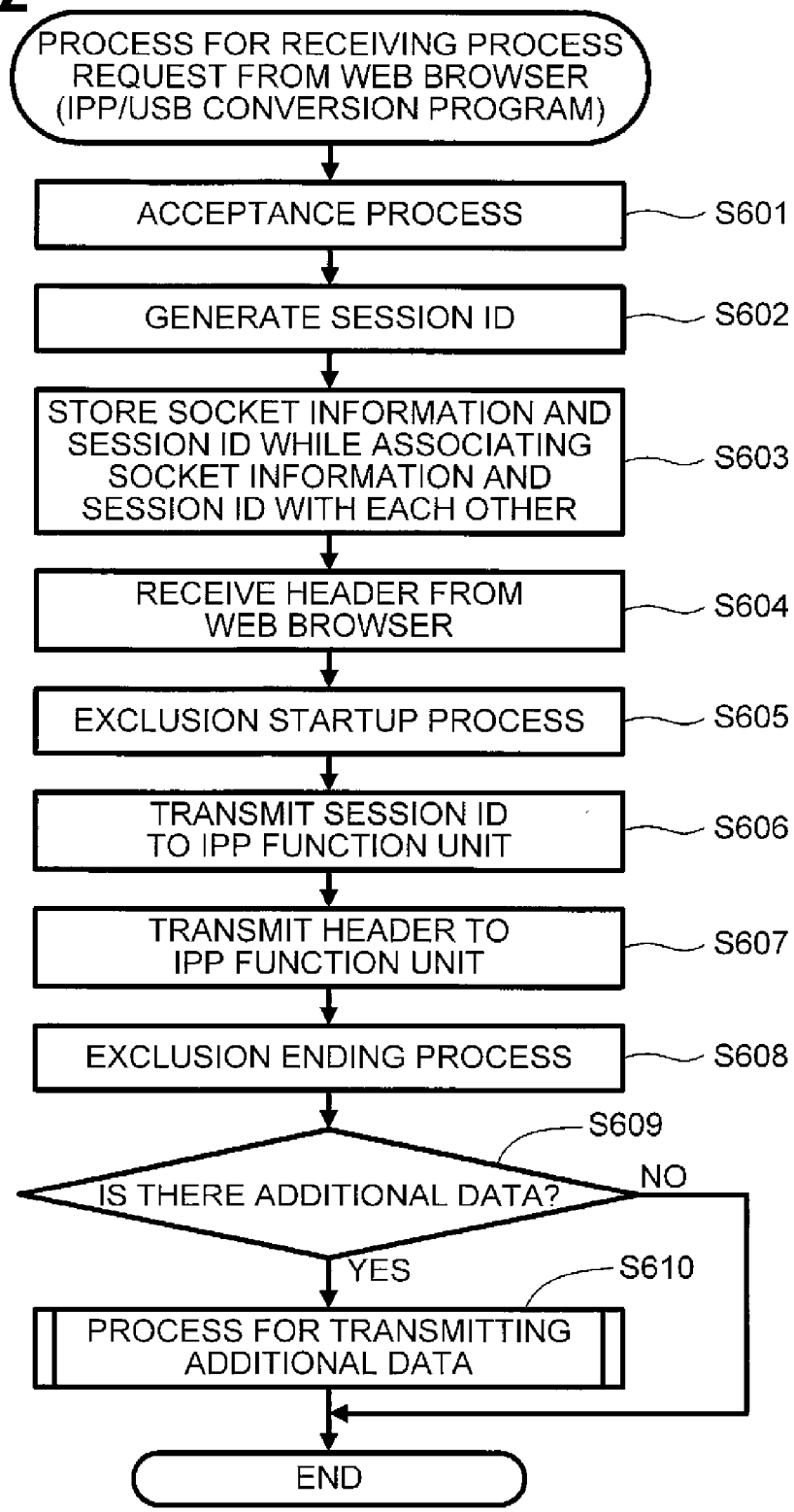
FIG. 12 is a flowchart illustrating a process for receiving a process request from a web browser.

Although omitted in FIG. 11, the IPP function unit 51 divides a response into pieces of partial response data including a header and additional data, adds a session ID to each piece of partial response data, and transmits the pieces of partial response data including session IDs to the IPP/USB conversion program 43.

(1) Process for Receiving Process Request from Web Browser

Next, a process for receiving a process request from a web browser according to the second embodiment will be described.
(1-1) Process for Receiving Process Request from Web Browser First, the process for receiving a process request from the web browser 42 performed by the IPP/USB conversion program 43 according to the second embodiment will be described with reference to FIG. 12. This process is executed by the thread generated in S104.

In S601, the thread executes the acceptance process.

In S602, the thread generates a session ID for identifying a socket generated in S601.

In S603, the thread stores socket information for identifying the socket generated in S601 and the session ID generated in S602 in a storage unit 25 while associating the socket information and the session ID with each other.

In S604, the thread receives a header of a process request from the web browser 42 through the session established in S601.

In S605, the thread executes the exclusion process for "Interface 1" of USB.

In S606, the thread transmits the session ID generated in S602 to the IPP function unit 51 through "Interface 1". The transmission may be performed using one of various methods. For example, the thread may transmit the session ID in accordance with a predetermined rule such as one that first 8 bytes of partial process request data to be transmitted in S607 serve as the session ID or one that a first line of the partial process request data serves as the session ID.

In S607, the thread transmits the header received in S604 to the IPP function unit 51 through "Interface 1". Here, if the header of the process request includes a plurality of pieces of communication data, the plurality of pieces of communication data are transmitted to the IPP function unit 51 in S607.

In S608, the thread ends the exclusion process for "Interface 1".

In S609, the thread determines whether or not there is additional data. More specifically, the thread determines that there is additional data if the header received in S604 includes "Content-Length" or "chunked", and determines that there is no additional data if the header does not include "Content-Length" or "chunked". If the thread determines that there is additional data, the process proceeds to S610. If the thread determines that there is no additional data, the process ends.

In S610, the thread executes a process for transmitting additional data. The process for transmitting additional data is a process for receiving additional data from the web browser 42 and transmitting the additional data to the IPP function unit 51. Details of the process for transmitting additional data will be described later.

(1-2) Process for Transmitting Additional Data

Figure 13:
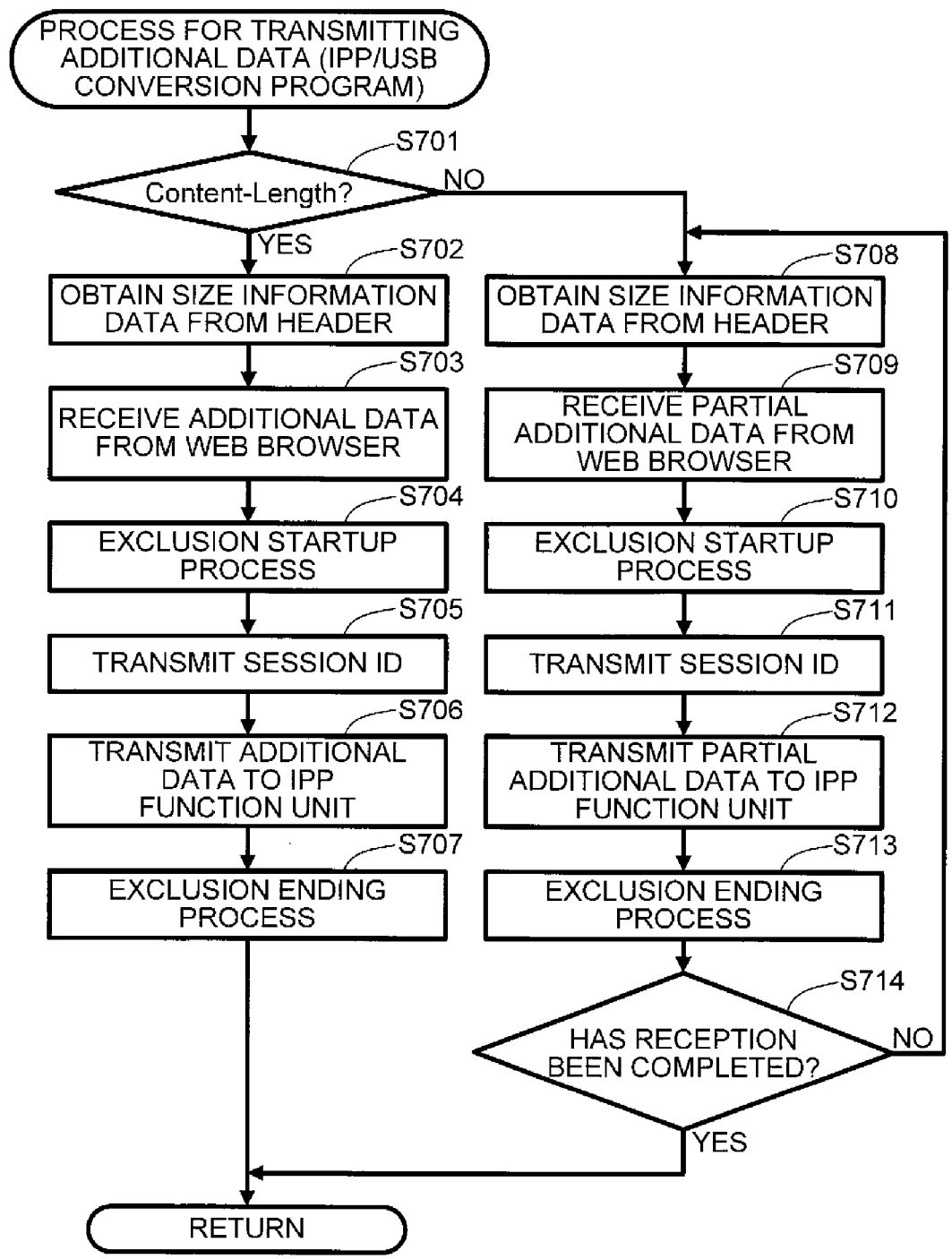
FIG. 13 is a flowchart illustrating a process for transmitting additional data.

Next, the process for transmitting additional data executed in S610 will be described with reference to FIG. 13.

In S701, the thread determines whether or not the received header includes "Content-Length". If the header includes "Content-Length", the process proceeds to S702. If the header does not include "Content-Length" (that means, if the header includes "chunked"), the process proceeds to S708.

In S702, the thread obtains size information data from the header received in S604.

In S703, the thread receives, from the web browser 42, additional data having a data size indicated by the size information data obtained in S702.

In S704, the thread executes an exclusion process for "Interface 1".

In S705, the thread transmits the session ID generated in S602 to the IPP function unit 51 through "Interface 1".

In S706, the thread transmits the additional data received in S703 to the IPP function unit 51 through "Interface 1".

In S707, the thread executes an exclusion ending process for "Interface 1".

In S708, the thread obtains size information data regarding data chunks. More specifically, the processing in S708 is performed when it has been determined in S701 that the additional data has been transmitted using "chunked". In this case, the additional data is normally divided into a plurality of data chunks, and information regarding the amount of data is added to each data chunk. In S708, the size information data regarding each data chunk is obtained.

In S709, the thread receives, from the web browser 42, a piece of partial additional data having a data size indicated by the size information data obtained in S709.

In S710, the thread executes the exclusion process for "Interface 1".

In S711, the thread transmits the session ID generated in S602 to the IPP function unit 51 through "Interface 1".

In S712, the thread transmits the piece of partial additional data received in S709 to the IPP function unit 51 through "Interface 1".

In S713, the thread executes an exclusion ending process for "Interface 1".

In S714, the thread determines whether or not reception of the additional data has been completed. More specifically, the thread determines whether or not there is a data chunk following the received additional data. This determination is performed in the same procedure as that in S207. If the thread determines that reception of the additional data has been completed, the process ends and returns to the "process for receiving a process request from the web browser", and if the thread determines that reception of the additional data has not been completed, the process returns to S708 and is repeated.

However, even after the process ends, the socket continues to exist.

(1-3) Process for Receiving Response from IPP Function Unit

Figure 14:
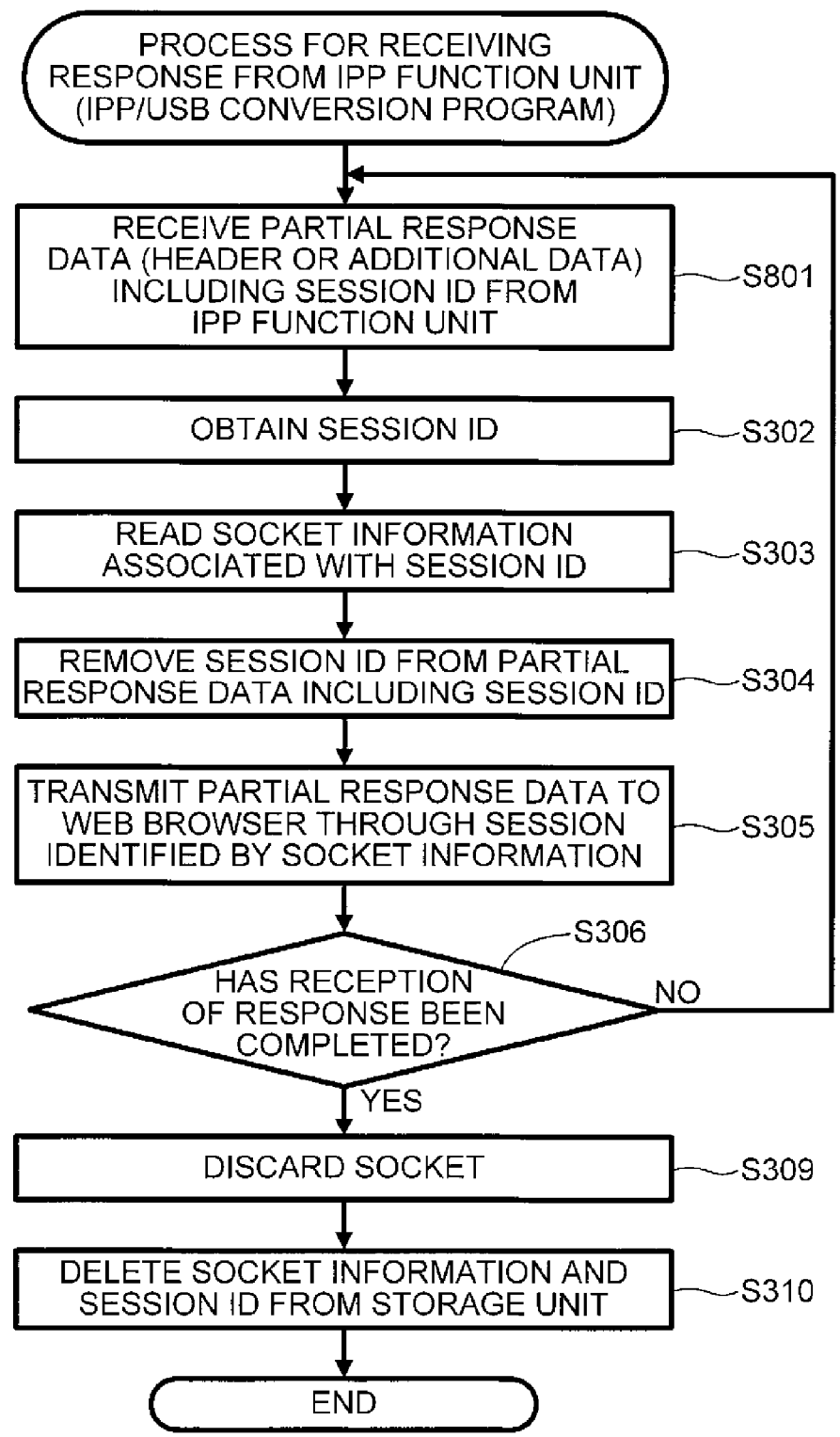
FIG. 14 is a flowchart illustrating a process for receiving a response from an IPP function unit.

Next, a process for receiving a response from the IPP function unit 51 performed by the IPP/USB conversion program 43 according to the second embodiment will be described with reference to FIG. 14. Here, processes that are substantially the same as those illustrated in FIG. 8 are given the same reference numerals, and description thereof is omitted.

In S801, the IPP/USB conversion program 43 receives a response from the IPP function unit 51 through "Interface 1" in the form of a header including a session ID or additional data including a session ID. More specifically, the header including a session ID is received when S801 is executed for the first time, and, thereafter, the additional data including a session ID is received when it has been determined in S306 that reception of the process request has not been completed and accordingly S801 is executed again.

Figure 8:
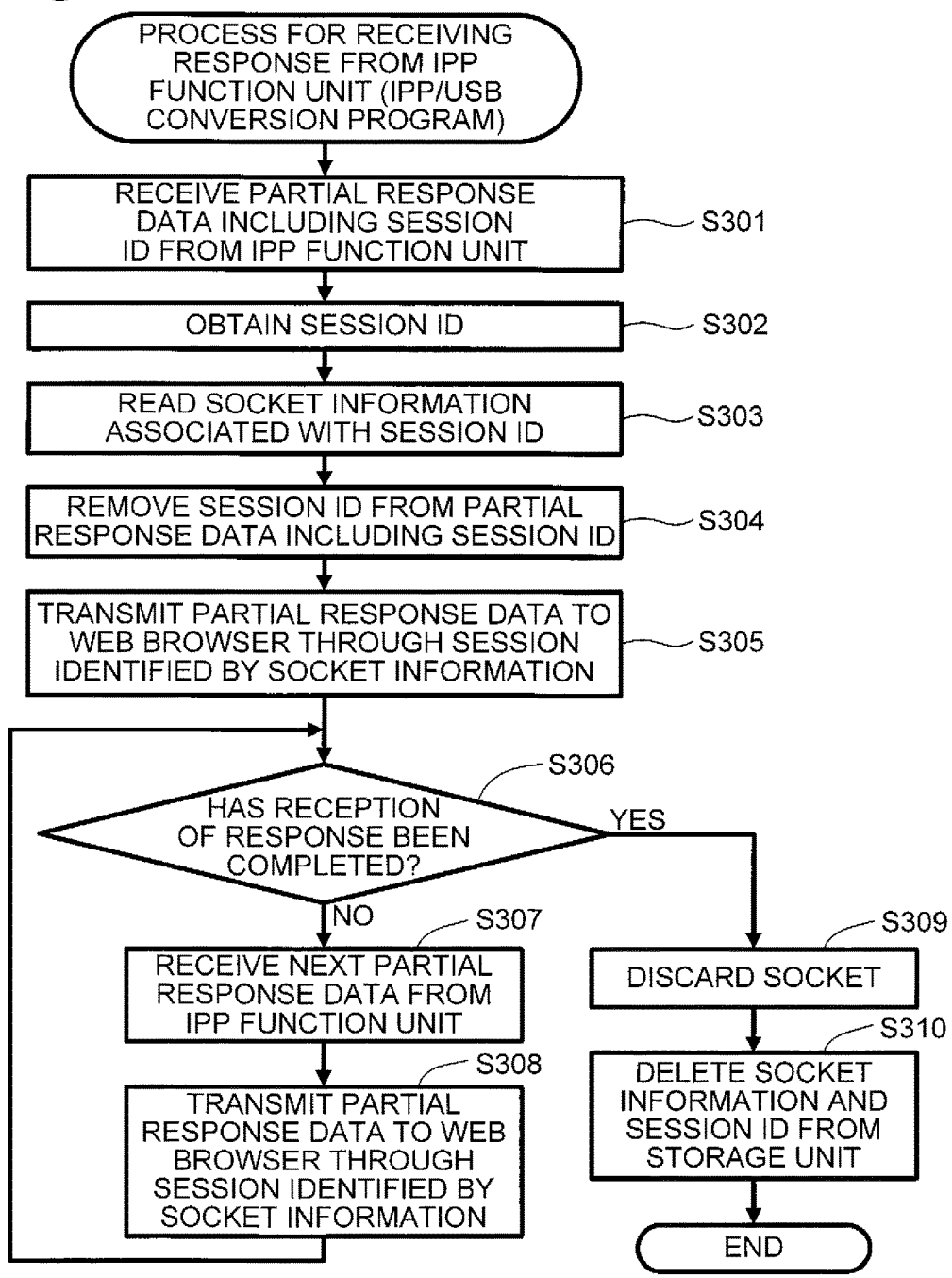
FIG. 8 is a flowchart illustrating a process for receiving a response from an IPP function unit.

Subsequent processes are the same as the processes illustrated in FIG. 8 to which the same reference numerals are given. However, since a session ID has been added to each piece of partial response data in the case of the process illustrated in FIG. 14, if the IPP/USB conversion program 43 determines in S306 that the result of the determination is negative, the process returns to S801 and a piece of partial response data including a session ID is received again, and then, after S302 and S303 are executed, the session ID is deleted in S304 and the partial response data is transmitted to the web browser 42 in S305.

(2) Processes Performed by IPP Function Unit

Next, processes performed by the IPP function unit 51 according to the second embodiment will be described.

(2-1) Process for Receiving Process Request from IPP/USB Conversion Program

Figure 15:
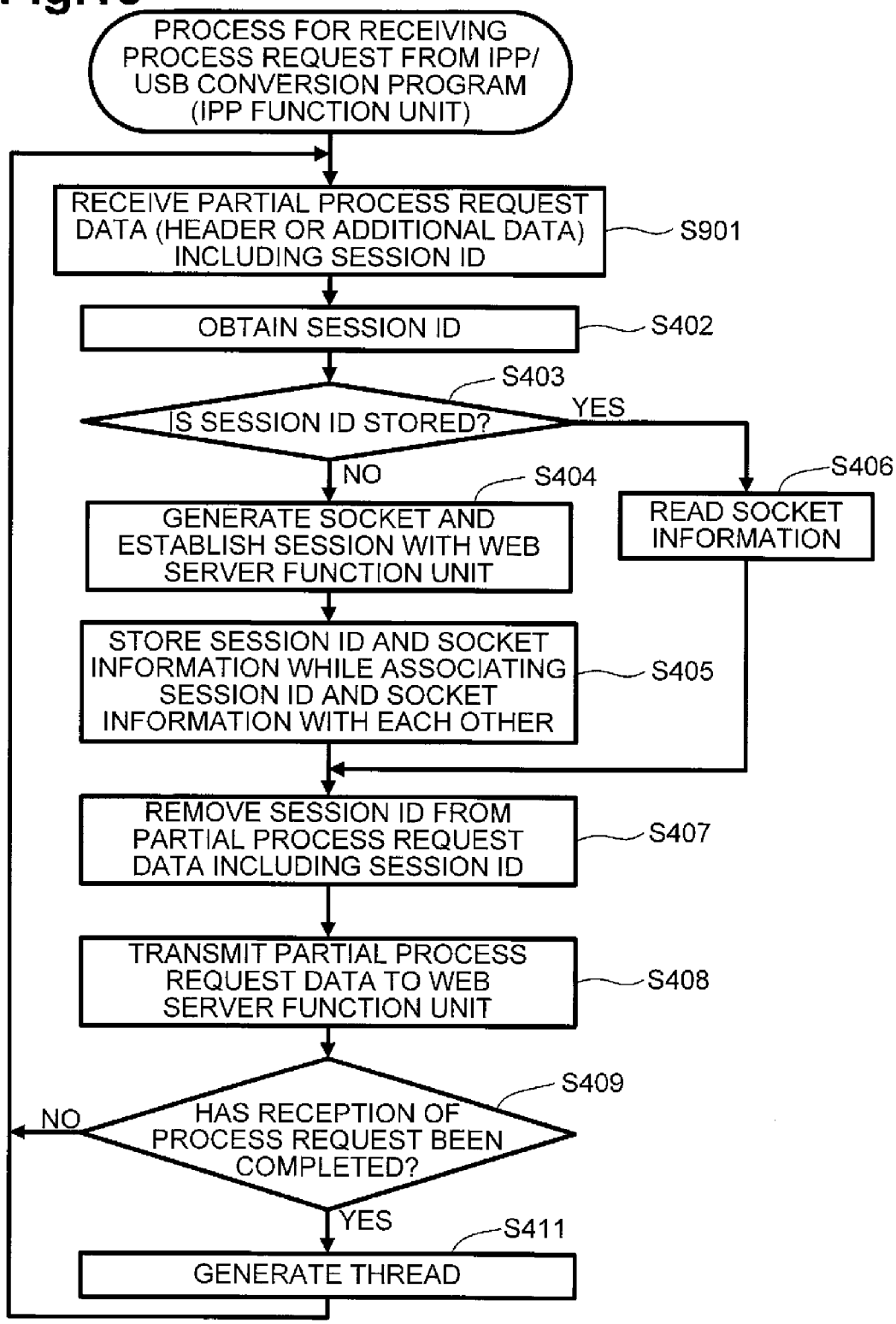
FIG. 15 is a flowchart illustrating a process for receiving a process request from an IPP/USB conversion program performed by the IPP function unit according to the second embodiment.

A process for receiving a process request from the IPP/USB conversion program 43 performed by the IPP function unit 51 according to the second embodiment will be described with reference to FIG. 15. Here, processes that are substantially the same as those illustrated in FIG. 9 are given the same reference numerals, and description thereof is omitted.

In S901, the IPP function unit 51 receives a process request from the IPP/USB conversion program 43 through Interface 1 in the form of a header including a session ID and additional data including a session ID. More specifically, the header including a session ID is received when S901 is executed for the first time, and, thereafter, the additional data including a session ID is received when it has been determined in S409 that reception of the process request has not been completed and accordingly S901 is executed again.

Figure 9:
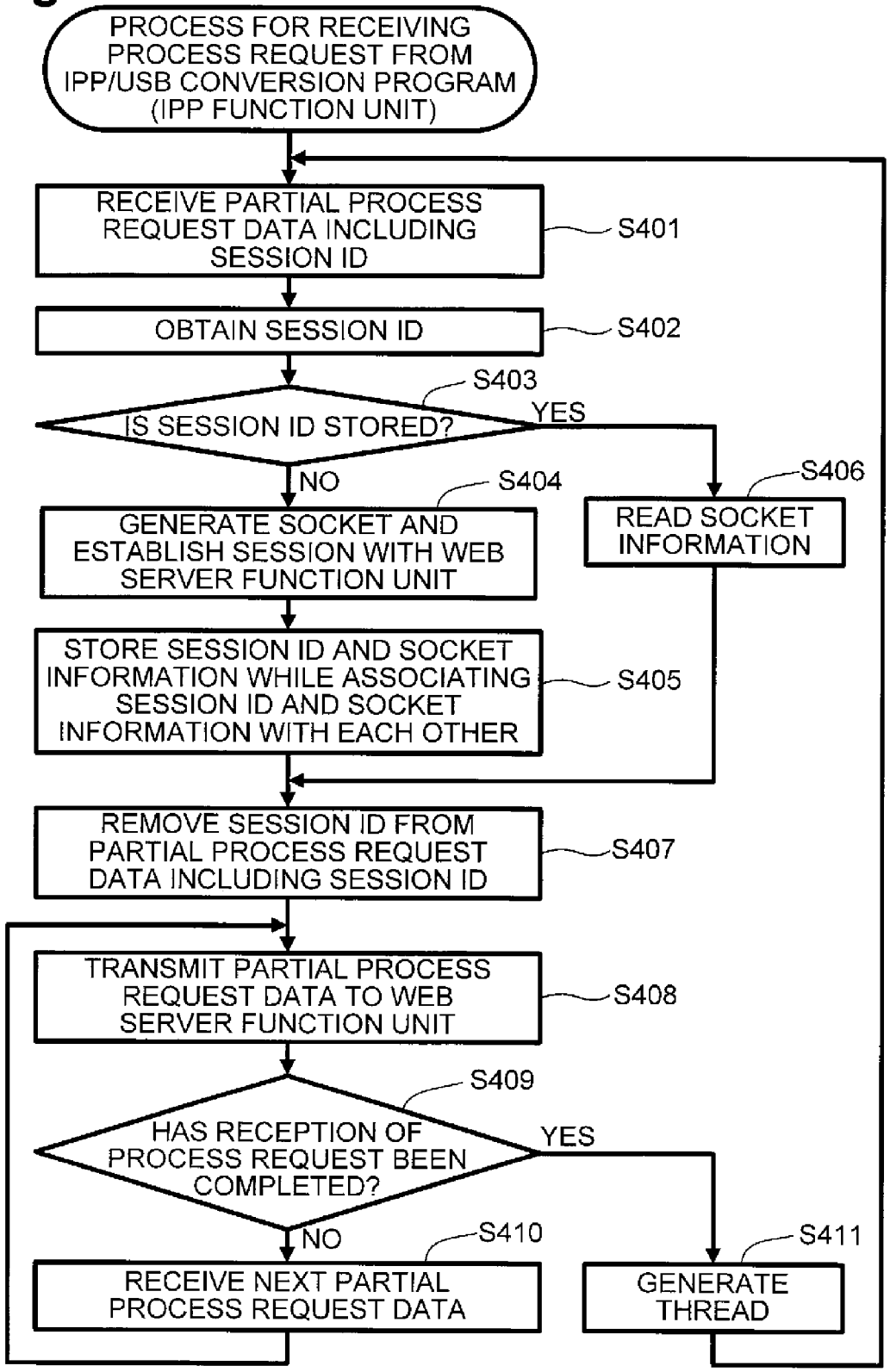
FIG. 9 is a flowchart illustrating a process for receiving a process request from an IPP/USB conversion program.

Subsequent processes are substantially the same as the processes illustrated in FIG. 9, but if it is determined in S409 that the result of the determination is negative, the IPP function unit 51 causes the process to return to S901. This is because a session ID has been added to each piece of partial process request data in the second embodiment and the pieces of partial process request data are transmitted to the web server function unit 52 after all the session IDs are removed in S407.

(2-2) Process for Receiving Response from Web Server Function Unit

Figure 16:
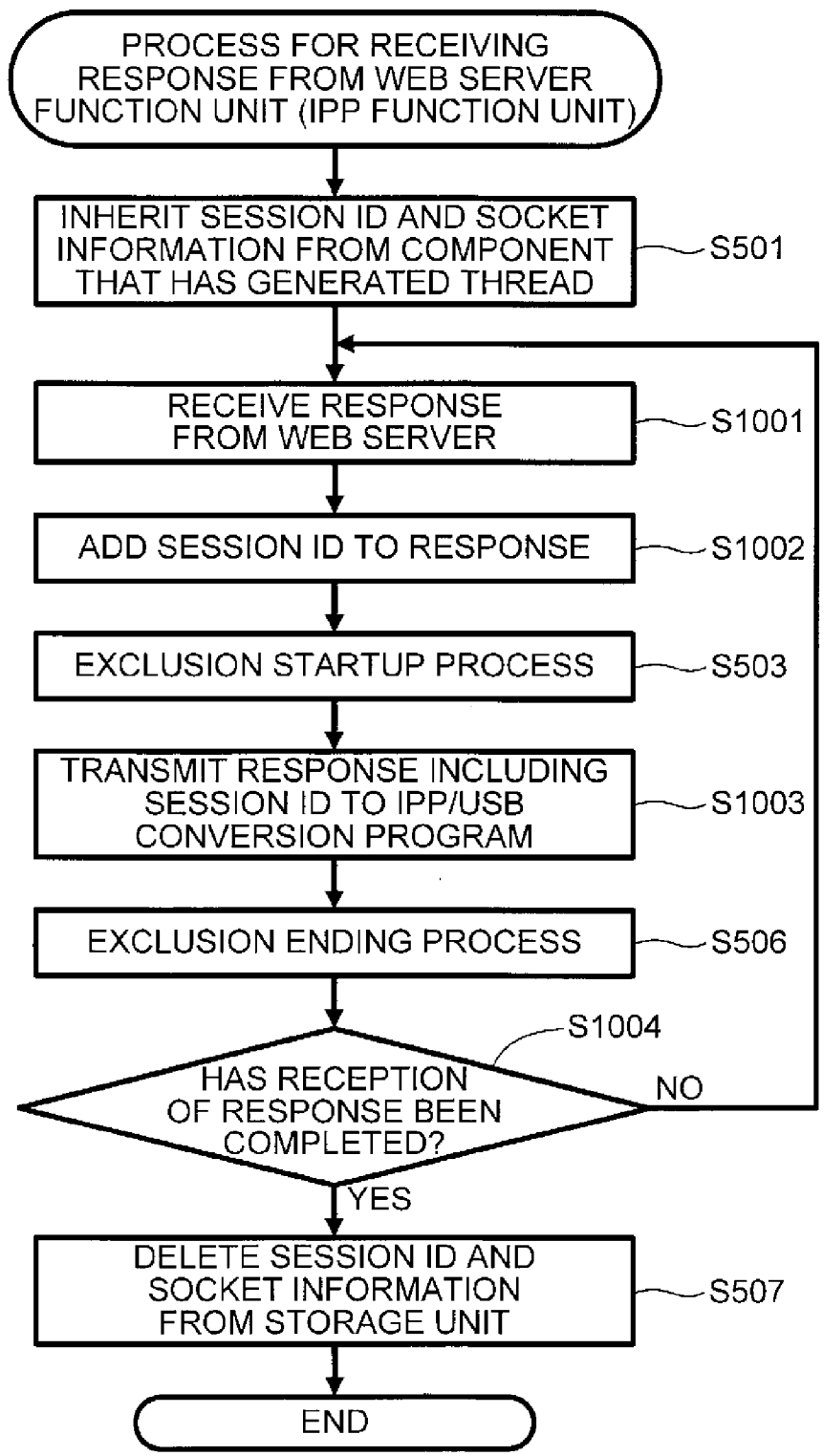
FIG. 16 is a flowchart illustrating a process for receiving a response from a web server function unit.

A process for receiving a response from the web server function unit 52 performed by the IPP function unit 51 according to the second embodiment will be described with reference to FIG. 16. Here, processes that are substantially the same as those illustrated in FIG. 10 are given the same reference numerals, and description thereof is omitted.

In S1001, the thread receives a header or additional data from the web server function unit 52 as a response. More specifically, the thread receives the header when S1001 is executed for the first time. Then if it has been determined in S1004 that reception of the response has not been completed, the process proceeds to S1001 and the thread receives the additional data in S1001.

In addition, in the second embodiment, a session ID is added to the header and each piece of additional data, and then the header and the pieces of additional data are transmitted to the IPP/USB conversion program 43. For example, when the header has been received in S1001, session information is added to the header in S1002, and the header to which the session information has been added is transmitted to the IPP/USB conversion program 43 in S1003. On the other hand, when the additional data has been received in S1001, session information is added to the additional data in S1002, and the additional data to which the session information has been added is transmitted to the IPP/USB conversion program 43 in S1003.

In S1004, the thread determines whether or not reception of the response from the web server function unit 52 has been completed. If the thread determines that reception has been completed, the process proceeds to S507, and if the thread determines that reception has not been completed, the process returns to S1001.

(3) Advantageous Effects Produced by Embodiment

According to the above-described IPP/USB conversion program 43 according to the second embodiment, since a process request is divided into a plurality of pieces of partial process request data (more specifically, a header and additional data) and a session ID is added to each piece of partial process request data, and then the plurality of pieces of partial process request data are transmitted to the printer 3, a plurality of process requests may be transmitted to the printer 3 in parallel with one another.

In addition, according to the printer 3 according to the second embodiment, since a response received from the web server function unit 52 is divided into a plurality of pieces of partial response data (more specifically, a header and additional data) and session information is added to each of the plurality of pieces of partial response data, and then the plurality of pieces of partial response data are transmitted to the IPP/USB conversion program 43, a plurality of responses may be transmitted to the IPP/USB conversion program 43 in parallel with one another.

In addition, according to the IPP/USB conversion program 43 and the printer 3 according to the second embodiment, since data whose data length is large and that is transmitted using "chunked" may be transmitted in units of data chunks and another piece of data may be transmitted during the transmission of the data chunks, data transfer may be performed more efficiently than that according to the first embodiment, and accordingly a high-speed operation may be expected.

Third Embodiment

Figure 17:
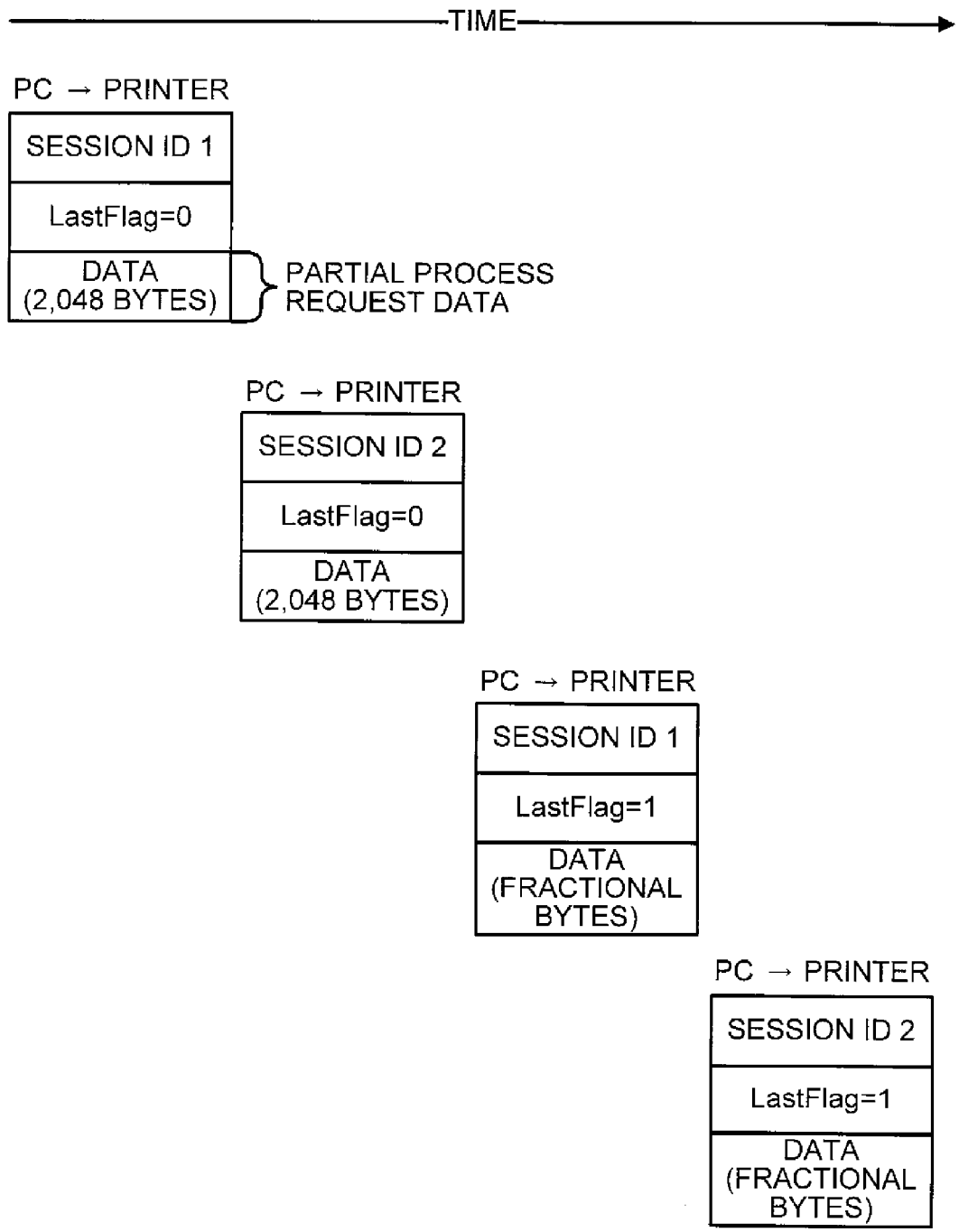
FIG. 17 is a schematic diagram illustrating process requests according to a third embodiment.
Figure 18:
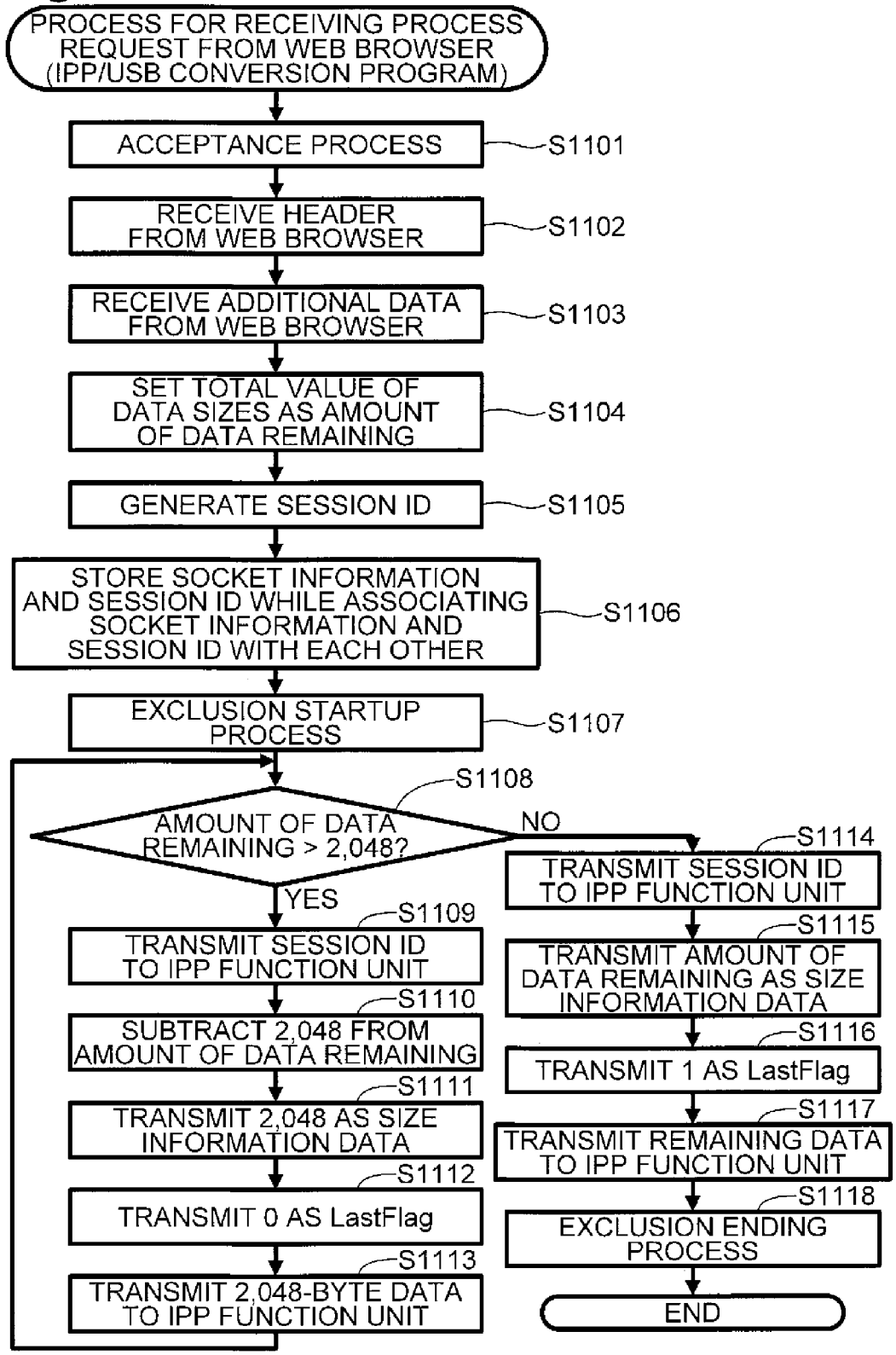
FIG. 18 is a flowchart illustrating a process for receiving a process request from a web browser.

Next, a third embodiment will be described with reference to FIGS. 17 and 18.

Process requests according to the third embodiment will be described with reference to FIG. 17. The IPP/USB conversion program 43 according to the second embodiment has been described while taking as an example a case in which a process request is divided into pieces of partial process request data including a header and additional data and transmitted to the IPP function unit 51. In contrast, an IPP/USB conversion program 43 according to the third embodiment divides a process request into pieces of partial process request data having a certain data size (for example, 2,048 bytes), adds a session ID and LastFlag to each of the pieces of partial process request data, and transmits the pieces of partial process request data to an IPP function unit 51.

LastFlag is information indicating whether or not transmission of a process request has been completed using "0" or "1". "0" indicates that transmission of a process request has not been completed, and "1" indicates that transmission of a process request has been completed. The IPP function unit 51 may determine whether or not reception of a process request has been completed by referring to LastFlag.

In addition, the IPP/USB conversion programs 43 according to the first and second embodiments begin to transmit a process request to the IPP function unit 51 without waiting for completion of reception of the process request from the web browser 42. In contrast, the IPP/USB conversion program 43 according to the third embodiment begins to transmit a process request to the IPP function unit 51 after reception of the process request from a web browser 42 is completed. However, in the third embodiment, too, transmission of a process request to the IPP function unit 51 may begin without waiting for completion of reception of the process request from the web browser 42, instead.

(1) Process for Receiving Process Request from Web Browser

Next, a process for receiving a process request from the web browser 42 performed by the IPP/USB conversion program 43 according to the third embodiment will be described with reference to FIG. 18.

In S1101, a thread executes the acceptance process.

In S1102, the thread receives a header from the web browser 42.

In S1103, the thread receives additional data from the web browser 42. After reception of the additional data is completed, the thread causes the process to proceed to S1104.

In S1104, the thread calculates the total value of the data size of the header received in S1102 and the data size of the additional data received in S1103, and sets the calculated total value as an initial value of the amount of data remaining, which is a variable indicating the data size of data that has not yet been transmitted (remaining data).

In S1105, the thread generates a session ID.

In S1106, the thread stores socket information indicating a socket generated in S1101 and the session ID generated in S1105 in the storage unit 25 while associating the socket information and the session ID with each other.

In S1107, the thread executes the exclusion process for "Interface 1".

In S1108, the thread determines whether or not the amount of data remaining is larger than 2,048 bytes. If the amount of data remaining is larger than 2,048 bytes, the process proceeds to S1109, and if the amount of data remaining is smaller than or equal to 2,048 bytes, the process proceeds to S1114.

In S1109, the thread transmits the session ID generated in S1105 to the IPP function unit 51.

In S1110, the thread subtracts 2,048 from the amount of data remaining

In S1111, the thread transmits 2,048 to the IPP function unit 51 as size information data.

In S1112, the thread transmits "0" to the IPP function unit 51 as LastFlag.

In S1113, the thread transmits a piece of partial process request data having a data size of 2,048 bytes to the IPP function unit 51, and the process returns to S1108.

In S1114, the thread transmits the session ID generated in S1105 to the IPP function unit 51.

In S1115, the thread transmits the amount of data remaining to the IPP function unit 51 as size information data.

In S1116, the thread transmits "1" to the IPP function unit 51 as LastFlag.

In S1117, the thread transmits a piece of remaining data having a data size indicated by the amount of data remaining to the IPP function unit 51.

In S1118, the thread ends the exclusion process for "Interface 1".

The IPP function unit 51 removes the session ID and LastFlag from each piece of received partial process request data, and transmits the resultant piece of partial process request data to a web server function unit 52.

The IPP function unit 51 transmits a response to the IPP/USB conversion program 43 in the same manner. That is, response data is divided into pieces of partial response data each having a data size of 2,048 bytes, data amount information and LastFlag(0) are added to each piece of partial response data, and the pieces of partial response data are transmitted. Data amount information and LastFlag(1) are added a last piece of partial response data, and the last piece of partial response data is transmitted.

The IPP/USB conversion program 43 removes the session ID and LastFlag from each piece of partial response data received from the IPP function unit 51, and transmits the resultant piece of partial response data to the web browser 42.

A method for using a session ID and a socket are the same as those according to the first and second embodiments.

The IPP function unit 51 may find a data end of the process request according to HTTP.

(2) Advantageous Effects Produced by Embodiment

According to the above-described IPP/USB conversion program 43 according to the third embodiment, since a process request is divided into pieces of partial process request data having a predetermined size and session information is added to each piece of partial process request data, and then the pieces of partial process request data are transmitted to the IPP function unit 51, a plurality of process requests may be transmitted to the printer 3 in parallel with one another.

Furthermore, according to the IPP/USB conversion program 43, since information indicating completion of transmission of a process request is transmitted to the printer 3 after all pieces of partial process request data are transmitted to the printer 3, the printer 3 may detect completion of reception of the process request.

Other Embodiments

The present invention is not limited to the embodiments described above with reference to the drawings, and, for example, the technical scope of the present invention may include the following embodiments.

(1) The first embodiment has been described while taking as an example a case in which a session ID is added to a process request as session information. Alternatively, socket information may be added instead of the session ID. In this case, the session ID and the socket information need not be associated with each other when the session ID and the socket information are stored in the storage unit 25.

(2) The second embodiment has been described while taking as an example a case in which a process request is divided into a plurality of pieces of partial process request data including a header and additional data. However, a method for dividing a process request into a plurality of pieces of partial process request data is not limited to this, and an arbitrary method may be used to divide a process request. For example, a process request may be divided into pieces of communication data, each of which is to be received from the web browser 42 at a time.

(3) The above embodiments have been described while taking the web browser 42 as an example of the client application that communicates using multisession. However, the client application may be another application, insofar as the application communicates using multisession.

(4) The above embodiments have been described while taking a USB cable as an example of the communication interface. However, the communication interface is not limited to a USB cable. For example, the PC 2 and the printer 3 may communicate with each other in accordance with IEEE 1284, which is a communication standard for printers.

(5) The above embodiments have been described while taking as an example a case in which a new thread is created each time establishment of a session is requested. Alternatively, processing for each session may be sequentially executed in the process for relaying communication without creating a thread. Alternatively, a process may be created instead of a thread, and processing performed by the thread may be performed by the process.

(6) The above embodiments have been described while taking as an example a case in which the PC 2 and the printer 3 are connected to each other by a plurality of logical communication interfaces. Alternatively, the PC 2 and the printer 3 may be connected to each other by a plurality of physical communication interfaces.

(7) The above embodiments have been described while taking the printer 3 as an example of the image processing apparatus. Alternatively, the image process apparatus may be a so-called multifunction peripheral having a printing function, a scanning function, a copying function, a fax function, and the like. Alternatively, the image processing apparatus may be a scanning apparatus or a fax machine having a single function.

(8) The above embodiments have been described while taking as an example a case in which the control unit 31 includes one CPU 31*a*. Alternatively, the control unit 31 may include one or more CPUs, an application-specific integrated circuit (ASIC), or a combination between one or more CPUs and an ASIC.

(9) In the above embodiments, the printer 3 is configured in such a way as not to request a plurality of pieces of request data in a single session using a keep-alive mechanism. However, the printer 3 may use the keep-alive mechanism by keep using a socket even after completion of transmission of a response.

The technique disclosed herein may be realized in various ways such as by a communication relay apparatus, a communication relay system, a method for relaying communication, and a recording medium on which a communication relay program is recorded.

What is claimed is:

1. A non-transitory computer-readable medium storing a communication relay program including instructions that, when executed by a processor, causes an information processing apparatus connected to an image processing apparatus through a communication interface, to:
   in response to a request for establishment of a session by a client application, the client application performing multi-session communication, establish a session between the communication relay program and the client application;
   receive a process request from the client application through the established session;
   add session information for identifying the established session to the process request received from the client application;
   transmit the process request including the session information to the image processing apparatus;
   receive from the image processing apparatus a response including the session information, such that the response is a response corresponding to the process request transmitted to the image processing apparatus;
   remove the session information from the response including the session information received from the image processing apparatus; and
   transmit the response without the session information to the client application through the session identified by the session information.

2. The non-transitory computer-readable medium according to claim 1, wherein the communication relay program further includes instructions that, when executed by the processor, cause the information processing apparatus to:
   when the session has been established between the communication relay program and the client application, generate a session identifier regarding the established session;
   store the session identifier and identification information for identifying the established session in a storage device while associating the session identifier and the identification information with each other,
   add the session identifier to the process request as the session information; and
   transmit the response to the client application through the session identified by the identification information associated with the session identifier added to the response received from the image processing apparatus.

3. The non-transitory computer-readable medium according to claim 2, wherein the communication relay program further includes instructions that, cause the information processing apparatus to:
   delete, after the response is transmitted to the client application, the session identifier and the identification information associated with the session identifier from the storage device.

4. The non-transitory computer-readable medium according to claim 1,
   wherein the client application transmits the process request while dividing the process request into a plurality of pieces of partial process request data, and
   wherein the communication relay program further includes instructions that, when executed by the processor, cause the information processing apparatus to:
   transmit the session information and a first piece of partial process request data to the image processing apparatus when the first piece of partial process request data has been received from the client application; and
   transmit the piece of partial process request data without the session information to the image processing apparatus when a piece of partial process request data subsequent to the first piece of partial process request data has been received from the client application.

5. The non-transitory computer-readable medium according to claim 1, wherein the communication relay program further includes instructions that, when executed by the processor, cause the information processing apparatus to:
   divide the process request into a plurality of pieces of partial process request data; and
   transmit the plurality of pieces of partial process request data to the image processing apparatus, each of the plurality of pieces of partial process request data including the session information.

6. The non-transitory computer-readable medium according to claim 5, wherein the communication relay program further includes instructions that, when executed by the processor, cause the information processing apparatus to divide the process request into pieces of partial process request data having a certain data size.

7. The non-transitory computer-readable medium according to claim 6, wherein the communication relay program further includes instructions that, when executed by the processor, cause the information processing apparatus to transmit information indicating completion of transmission of the process request to the image processing apparatus in response to transmission of all the pieces of partial process request data to the image processing apparatus.

8. The non-transitory computer-readable medium according to claim 1,
   wherein the communication interface is a universal serial bus cable.

9. The non-transitory computer-readable medium according to claim 1,
   wherein the client application is a web browser.

10. A communication relay apparatus comprising:
a communication device configured to communicate with an image processing apparatus through a communication interface;
a processor; and
a storage device configured to store a communication relay program including instructions that, when executed by the processor, causes the image processing apparatus to:
when establishment of a session is requested by a client application that performs multi-session communication, establish a session between the communication relay program and the client application;
receive a process request from the client application through the established session;
add session information for identifying the established session to the process request received from the client application;
transmit the process request including the session information to the image processing apparatus;
receive from the image processing apparatus a response including session information, which is a response corresponding to the process request transmitted to the image processing apparatus;
remove the session information from the response including session information received from the image processing apparatus; and
transmit the response without the session information to the client application through the session identified by the session information.

11. An image processing apparatus comprising:
a communication interface for communication with an information processing apparatus; and
a processor including Internet Printing Protocol (IPP) module and response module, wherein the processor is configured to:
receive a process request including first session information from the information processing apparatus;
determine whether or not second session information is stored in a storage device and is associated with communication information for identifying a particular communication established between the IPP module and the response module, wherein the second session information is identical to the first session information included in the received process request;
when it is determined that the second session information is not stored:
establish new communication between the IPP module and the response module, the new communication being different from the particular communication;
store communication identification information for identifying the new communication and the first session information in the storage device while associating the communication identification information and the first session information with each other, and
transmit, to the response module through the new communication, a first partial process request generated by removing the first session information from the received process request;
in response to transmitting the first partial process request, receive a first response to the first partial process request from the response module;
add the first session information stored in the storage device to the first response received from the response module; and
transmit the first response with the added first session information to the information processing apparatus,
when it is determined that the second session information is stored:
transmit, to the response module through the particular communication, a second partial process request generated by removing the first session information from the received process request;
in response to transmitting the second partial process request, receive a second response to the second partial process request from the response module;
add the second session information stored in the storage device to the second response received from the response module; and
transmit the second response with the added second session information to the information processing apparatus.

12. The image processing apparatus according to claim 11, wherein the response module includes a web server function unit.

13. The image processing apparatus according to claim 11, wherein, the processor is further configured to:
divide the first response received from the response module into a plurality of pieces of first partial response data;
add the first session information to each of the plurality of pieces of first partial response data;
transmit each of the plurality of pieces of first partial response data with the added first session information to the information processing apparatus;
divide the second response received from the response module into a plurality of pieces of second partial response data;
add the second session information to each of the plurality of pieces of second partial response data; and
transmit each of the plurality of pieces of second partial response data with the added second session information to the information processing apparatus.

* * * * *